(12) United States Patent
Nakata

(10) Patent No.: US 9,436,419 B2
(45) Date of Patent: Sep. 6, 2016

(54) SELECTIVELY PRINTING PORTIONS OF A WEB PAGE BASED ON USER SELECTION

(71) Applicant: CANON KABUSHIKI KAISHA, Tokyo (JP)

(72) Inventor: Hiroaki Nakata, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/934,089

(22) Filed: Nov. 5, 2015

(65) Prior Publication Data

US 2016/0062707 A1 Mar. 3, 2016

Related U.S. Application Data

(63) Continuation of application No. 12/686,784, filed on Jan. 13, 2010, now abandoned.

(30) Foreign Application Priority Data

Feb. 3, 2009 (JP) ................................. 2009-022963

(51) Int. Cl.
*G06F 3/12* (2006.01)
*G06F 3/0485* (2013.01)
*G06F 17/21* (2006.01)
(Continued)

(52) U.S. Cl.
CPC ........... *G06F 3/1256* (2013.01); *G06F 3/0481* (2013.01); *G06F 3/0486* (2013.01); *G06F 3/04842* (2013.01); *G06F 3/04845* (2013.01); *G06F 3/1204* (2013.01); *G06F 3/1243* (2013.01); *G06F 3/1257* (2013.01); *G06F 3/1258* (2013.01); *G06F 17/212* (2013.01); *G06F 17/2247* (2013.01); *G06F 17/2264* (2013.01)

(58) Field of Classification Search
CPC ............... G06F 3/1204; G06F 3/1257; G06F 3/04845; G06F 17/212; G06F 3/1243; G06F 3/1256; G06F 3/1208; H04N 1/00161; H04N 1/0044; H04N 1/00456
USPC ......................................... 358/1.15; 715/274
See application file for complete search history.

(56) References Cited

U.S. PATENT DOCUMENTS 5,673,403 A 9/1997 Brown et al.
6,633,413 B1 10/2003 Schlank et al.
(Continued)

FOREIGN PATENT DOCUMENTS

| JP | 11-250054 A | 9/1999 |
| JP | 2002-63013 A | 2/2002 |
| JP | 2005-340992 A | 12/2005 |

OTHER PUBLICATIONS

Smart Web Printing HP with Examiner provided Fig. 1.*
(Continued)

*Primary Examiner* — Eric A Rust
(74) *Attorney, Agent, or Firm* — Fitzpatrick, Cella, Harper & Scinto

(57) ABSTRACT

To reduce the workload involved in rearranging and printing a Web page in a desired layout, style sheets for realizing desired print layouts are saved in association with the URLs of Web pages, and when subsequently printing a Web page having the same domain name or a similar URL, a print layout to which a saved style sheet has been applied is presented as a candidate, and applied when printing the Web page.

12 Claims, 19 Drawing Sheets

(51) Int. Cl.
  *G06F 3/0481* (2013.01)
  *G06F 3/0484* (2013.01)
  *G06F 3/0486* (2013.01)
  *G06F 17/22* (2006.01)

(56) References Cited

U.S. PATENT DOCUMENTS

| | | |
|---|---|---|
| 7,499,196 B2 | 3/2009 | Nakata et al. |
| 7,586,639 B2 | 9/2009 | Nakata |
| 7,685,514 B1 | 3/2010 | Khatwani et al. |
| 8,717,597 B2 | 5/2014 | Nakata |
| 2004/0125398 A1 | 7/2004 | Aiyama |
| 2006/0290976 A1 | 12/2006 | Ko et al. |
| 2007/0136253 A1 | 6/2007 | Watanabe |
| 2008/0134027 A1 | 6/2008 | Saeki et al. |
| 2009/0089811 A1 | 4/2009 | Ferlitsch |
| 2010/0162151 A1 | 6/2010 | Class et al. |

OTHER PUBLICATIONS

UI Design and Microsoft Windows, Nov. 1, 2008; retrieved from http://rocketsilence.com/db/category/microsoft/ on Nov. 6, 2013.

* cited by examiner

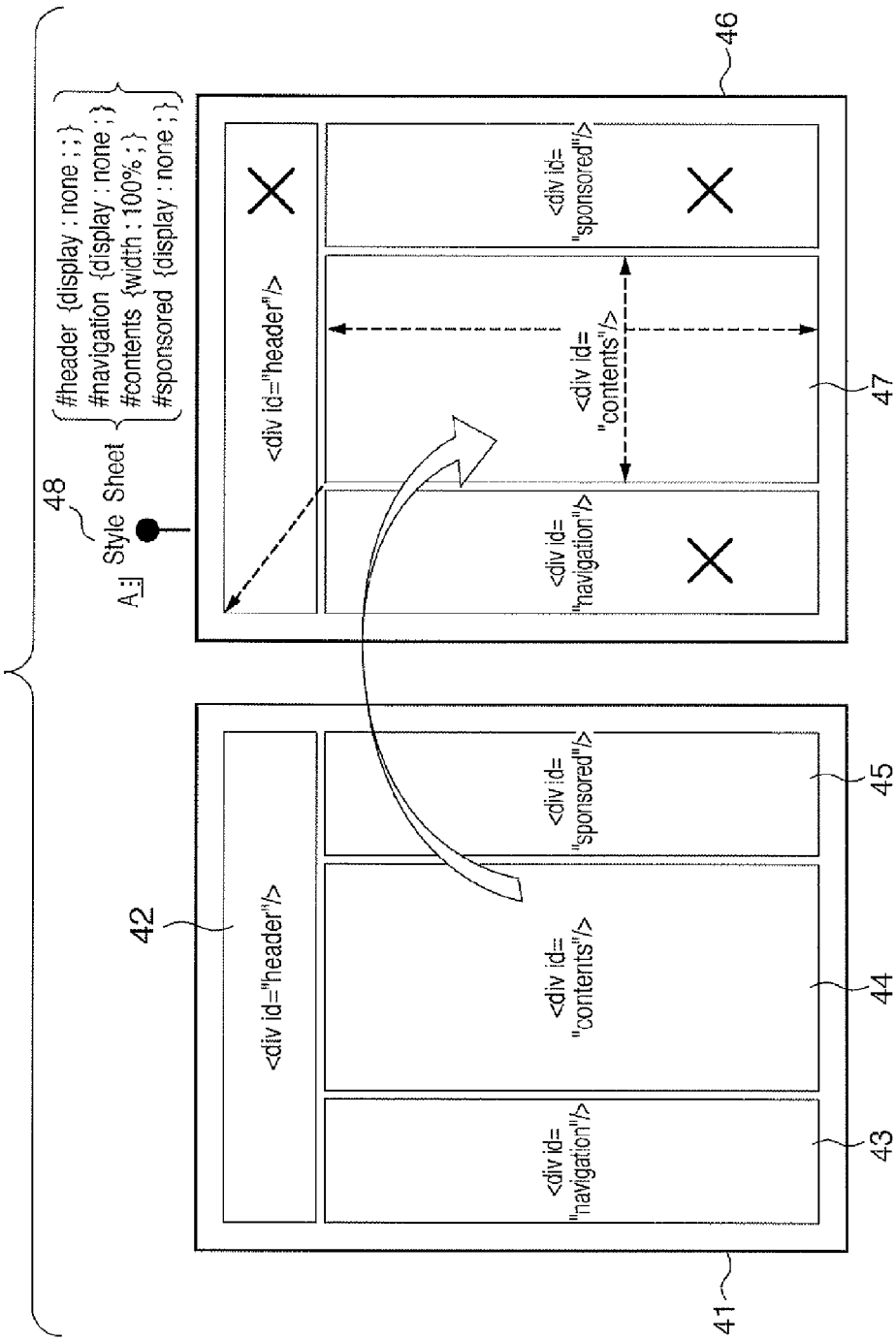

FIG. 8

```
#header {display : none ; }
#navigation {display : none ; }
#contents {width : 100% ; }
#sponsored {display : none ; }
```
48

FIG. 9

| ENTRY | URL | STYLE SHEET | CREATION DATE / TIME | USAGE FREQUENCY |
|---|---|---|---|---|
| #1 | ------.com/photonews/200804 | #header {display : none ; } #navigation {display : none ; } #contents {width : 100% ; } #sponsored {display : none ; } | 2008/4/1 | 4 |
| #2 | ------.com/article/20080320aaa | #header {width : 100% ; height : 50px ; } #navigation {display : none ; } | 2008/2/18 | 2 |
| #3 | ++++++.co.jp/headline/2008.8.10/ | #top {width : 80% ; } #menu {display : none ; } | 2008/8/10 | 1 |
| #4 | ------.com/colum/politics/ | #header {width : 60% ; align : center ; } # navigation {display : none ; } #contents {width : 80% ; } | 2008/9/3 | 3 |

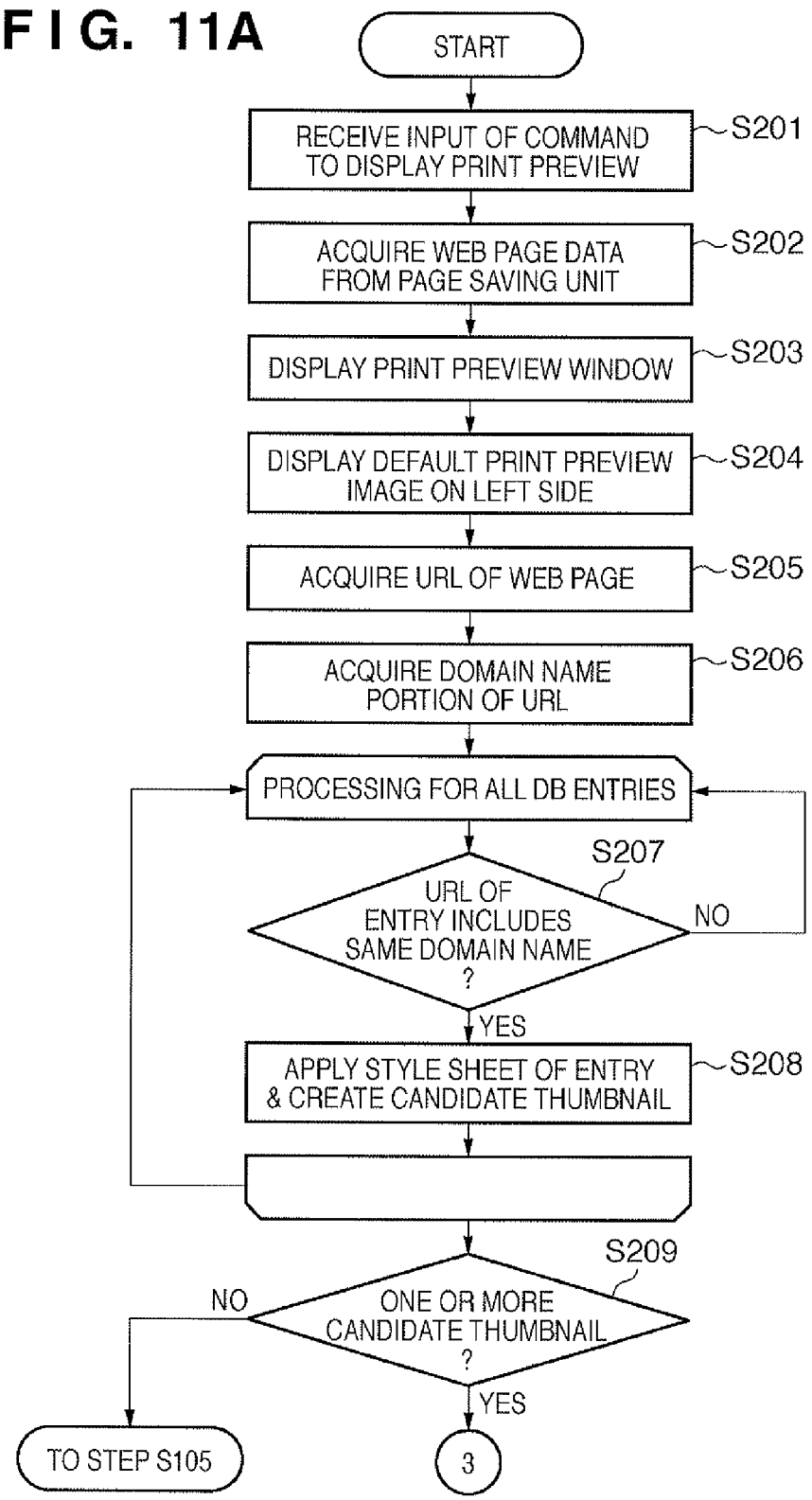

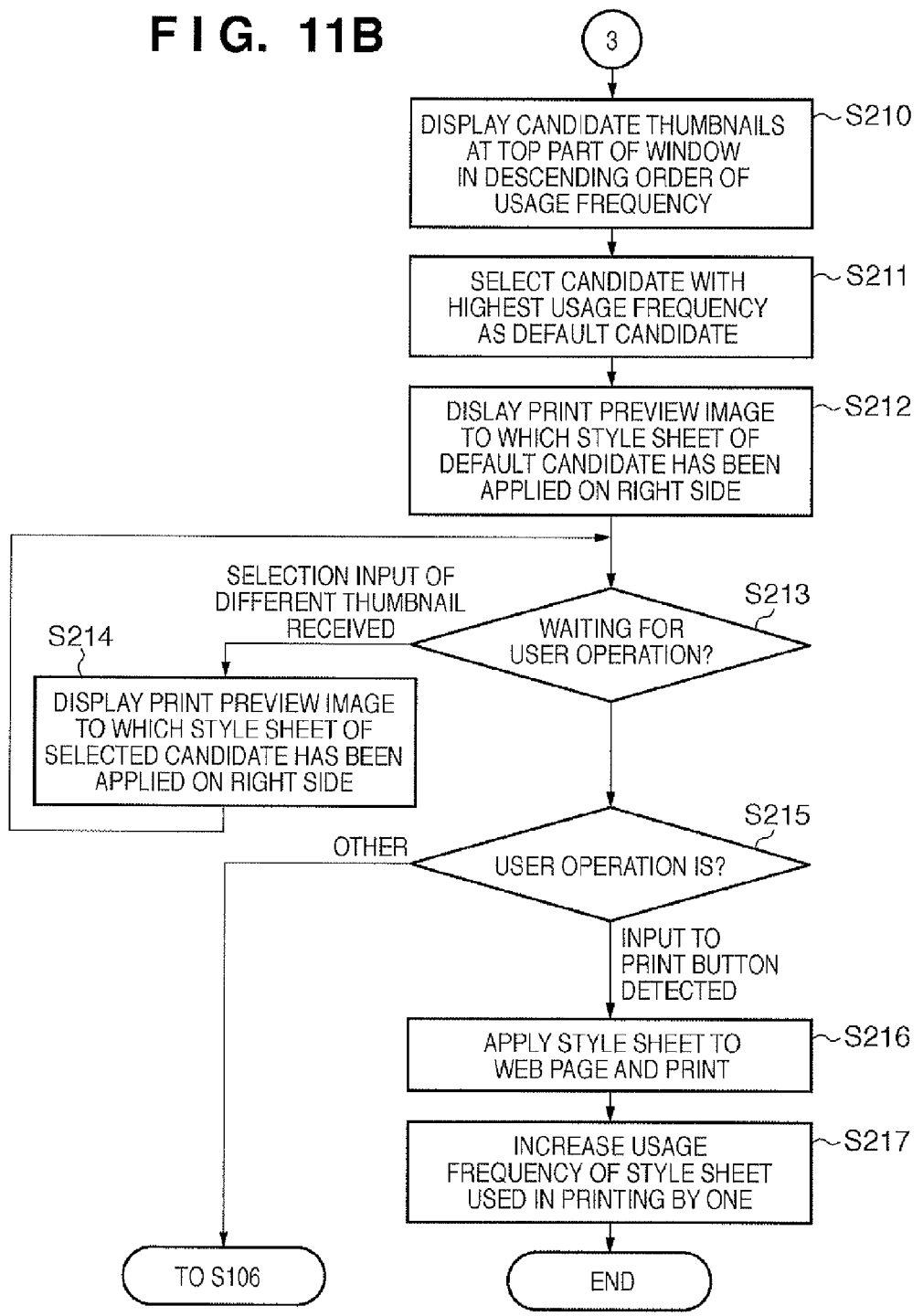

SELECTIVELY PRINTING PORTIONS OF A WEB PAGE BASED ON USER SELECTION

This application is a continuation of U.S. application Ser. No. 12/686,784, filed Jan. 13, 2010 (pending), the contents of which are incorporated herein by reference.

BACKGROUND OF THE INVENTION

1. Field of the Invention

The present invention relates to an information processing apparatus and a print control method, and more particularly to an information processing apparatus and method for printing, in a desired layout, a Web page constituted by a plurality of parts such as with a multi-column layout.

2. Description of the Related Art

FIG. 1 shows an example of a Web page with a typical multi-column structure. In most cases, a main content P10, such as the body of a news article or a blog article (entries), is arranged in the center. Secondary content such as a header P20, a navigation bar P30 (internal and external site links) and banner advertisements P40 are arranged as parts (objects) around the main content. This secondary Web content P20 to P40 is necessary for easily moving between displayed Web pages, for instance, and is not really necessary in the case of reading a Web page printed on paper.

Thus, Web site designers have heretofore been recommended to provide Web sites with "style sheets for printing" that eliminate parts such as navigation bars and advertisements, separately from the pages for display. By using these style sheets, printed material from which navigation bars, advertisements and the like has been removed can be obtained, as shown in FIG. 2. Here, a print style sheet is layout information for converting a page for display such as in FIG. 1 to a layout such as the page for printing in FIG. 2, and, specifically, contains instructions that result in only the main content P10 being printed the full width of the page.

However, since the work involved in providing style sheets for printing falls on Web site designers, there are many Web sites with respect to which style sheets have not been prepared, and printing can only be performed in the same layout as the pages for display. Also, since advertisements, internal and external site links and the like are sometimes arranged on the pages for printing, it is not necessarily the case that all pages for printing will be in a layout desired by the user who actually performs the printing.

Techniques such as shown in Japanese Patent Laid-Open No. 11-250054 and in HP Inkjet Printers—Using Smart Web Printing Software ([online, Japanese only], updated August 2008, Hewlett-Packard Japan Ltd., viewed Dec. 25, 2008, URL: http://h10025.www1.hp.com/ewfrf/ws/document?1c=ja&cc=jp&docuname=c01418497) have been proposed in order to alleviate this shortcoming with pages for printing. In Japanese Patent Laid-Open No. 11-250054, a technique for extracting and rearranging a plurality of objects constituting a Web page and generating a new Web page in a free layout is discussed. Also, HP Inkjet Printers—Using Smart Web Printing Software is an example of software that has actually been developed. A page to be printed can be created with the feel of a scrapbook by using this software to copy and paste portions of a Web page that the user wants to print.

Using the techniques disclosed in Japanese Patent Laid-Open No. 11-250054 and HP Inkjet Printers—Using Smart Web Printing Software enables a desired print layout to be realized by rearranging a Web page. However, the user has to carry out the tedious process of rearranging the objects forming the print target, whenever he or she wants to print a Web page. For example, in the case where a user frequently visits a given news site and frequently prints pages thereof, he or she must perform the process of cutting and rearranging only the articles while eliminating advertisements and the like every time, despite this process being predictable. While this is a standard process, it is difficult to automate the rearranging process with conventional methods, since the length of articles varies even within the same site.

SUMMARY OF THE INVENTION

The present invention has been made in consideration of the prior art described above, and provides an information processing apparatus and a print control method that are able to reduce the hassle involved in the process of rearranging a Web page for printing, and enable a Web page to be easily printed in a desired layout.

In order to solve the above problem, the present invention has the following configuration.

According to an aspect of the present invention, an information processing apparatus for printing a Web page constituted by a plurality of parts, comprises: a selecting unit, configured to select a part to be printed from parts constituting a Web page targeted for printing; a creating unit, configured to create a style sheet for printing on which the part selected by the selecting unit has been rearranged; a storage unit, configured to store the style sheet in association with an address of the print target Web page; an extracting unit, configured to, in a case where a Web page newly targeted for printing is displayed, extract a style sheet to be used for the new Web page from one or more style sheets stored by the storage unit, based on an address of the new Web page; and a generating unit, configured to generate a print page based on the style sheet extracted by the extracting unit and the new Web page.

According to the present invention, the process of printing a Web page in a layout desired by a user can be realized without performing rearranging every time printing is performed.

Further features of the present invention will become apparent from the following description of exemplary embodiments (with reference to the attached drawings).

BRIEF DESCRIPTION OF THE DRAWINGS

FIG. 7 is a schematic view showing a process of erasing unnecessary parts and re-laying out using a style sheet.

FIG. 8 shows an example style sheet.

FIG. 9 shows an example style sheet DB.

FIGS. 11A and 11B are flowcharts showing a flow of a process of selecting and printing a candidate.

DESCRIPTION OF THE EMBODIMENTS

Embodiment 1

Figure 3:
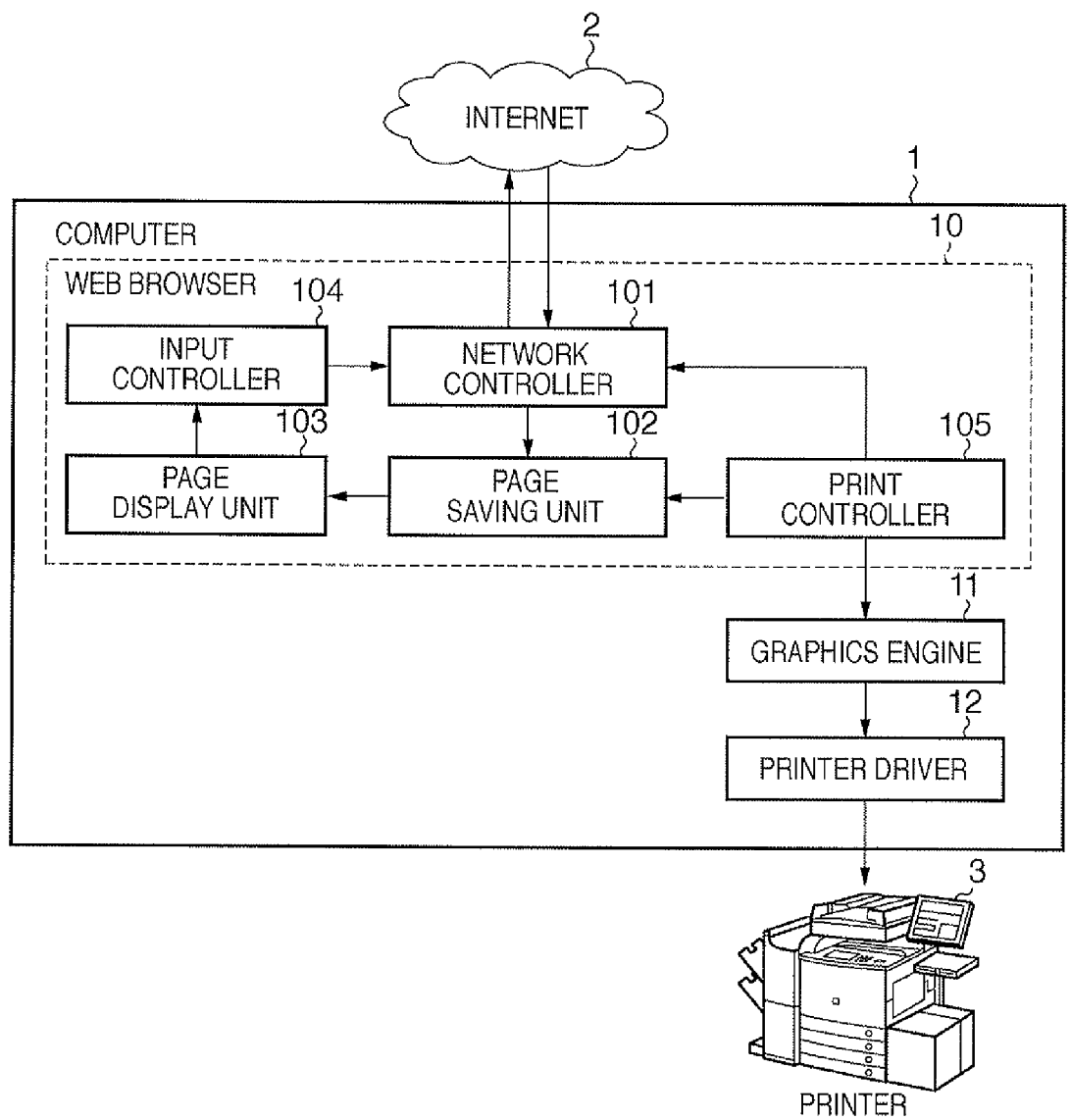
FIG. 3 is a block diagram showing a configuration of an entire system according to a first embodiment of the present invention.

FIG. 3: Description of Web Browser

FIG. 3 illustrates an example configuration of an entire system including an external environment of a Web page printing apparatus according to a first embodiment of the present invention. In FIG. 3, a computer 1 is connected to the Internet 2 and a printer 3 by a network interface such as an Ethernet®. A Web browser 10 is an application program that operates on an operating system of the computer 1, that is, an information processing apparatus. The Web browser 10 accesses a Web server specified by a designated address, that is, an URL, and displays, as an image, Web content such as HTML data or image data provided from the Web server. A network controller 101, which is one of the components constituting the Web browser 10, performs processing such as Web content acquisition from the Internet 2. A page saving unit 102, which is similarly one of the internal components of the Web browser 10, saves Web content acquired by the network controller 101 to a main storage apparatus such as a memory or an external storage apparatus such as a hard disk. The page saving unit 102 also extracts saved Web content in response to a request from an external component.

A page display unit 103 extracts a Web page saved by the page saving unit 102, and displays the Web page in a window after interpreting description therein written in HTML language. Also, the page display unit 103, in the case where a style sheet is designated for the Web page, displays the Web page after applying the style sheet. An input controller 104 performs processing according to menu commands performed on the Web browser 10 and input with respect to links or buttons displayed on a Web page. In the case where a link on a Web page is clicked, for example, the input controller 104 instructs the network controller 101 to acquire the Web page of that link.

A print controller 105 is a component that performs the main processing of the present invention, and performs processing such as print preview display, layout modification, and printing of a Web page. The print controller 105 may be incorporated as part of the Web browser 10 in advance, or may be a plug-in that can be added later. The internal system of the print controller 105 will be discussed in detail later.

A graphics engine 11 is a component that controls a rendering process of the operating system, and performs a role of mediating rendering commands from a printing unit. A printer driver 12 is software that receives rendering commands mediated by the graphics engine 11, converts the rendering commands to PDL data that can be interpreted by the printer 3, and outputs the PDL data. The printer 3 prints the PDL data output by the printer driver 12. Note that an example in which the printer 3 is a digital multifunction peripheral connected to a computer by a network such as an Ethernet is shown here. However, the present invention is not limited to this, and may be an inkjet printer connected by a USB interface.

Figure 17:
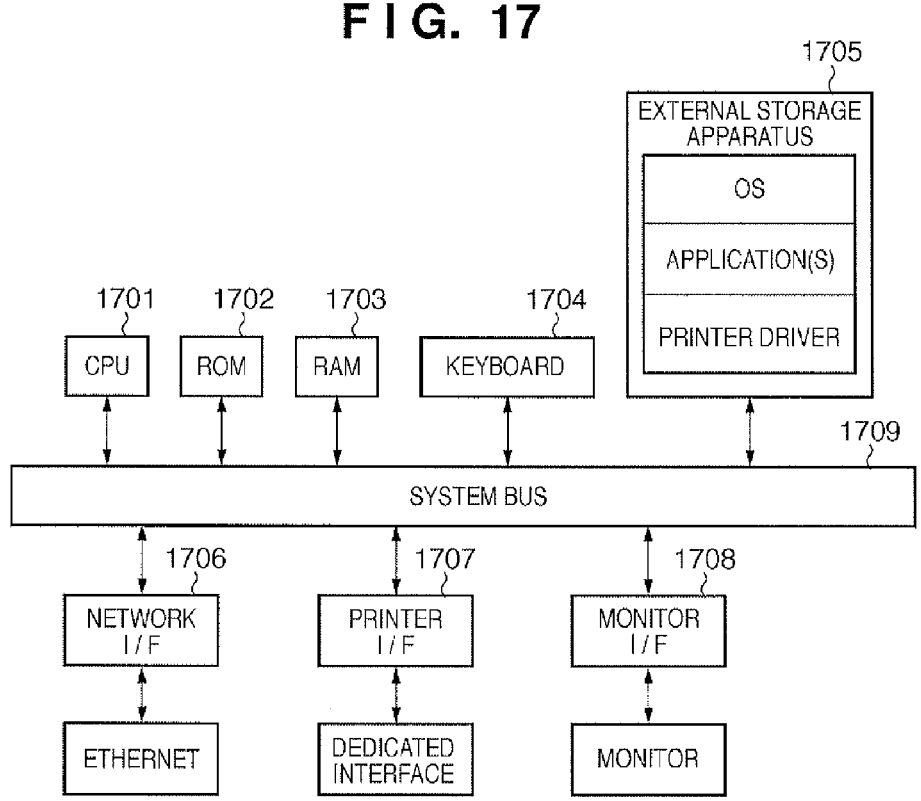
FIG. 17 is a block diagram showing a hardware configuration of a computer.

FIG. 17: Hardware Configuration of Computer

FIG. 17 is a block configuration diagram representing an internal system of the computer 1, which is a generic computer. A CPU 1701 performs control of the entire apparatus in accordance with programs stored in a ROM 1702, a RAM 1703 or an external storage apparatus 1705. These programs include an operating system, a Web browser, and plug-in software thereof. The RAM 1703 is used as a work area for when the CPU 1701 performs various processing. The external storage apparatus 1705 stores data and programs such as an operating system (OS), application software, and printer driver software. A keyboard 1704 or an input device such a mouse (not shown) is a device for a user to provide various instructions. A network I/F 1706 and a printer I/F 1707 are interfaces for connecting to a printer 20 via an Ethernet or a dedicated interface, and sending and receiving data. A monitor I/F 1708 is an interface for connecting to a monitor and transferring display data. Also, reference numeral 1709 is a common data bus.

Figure 4:
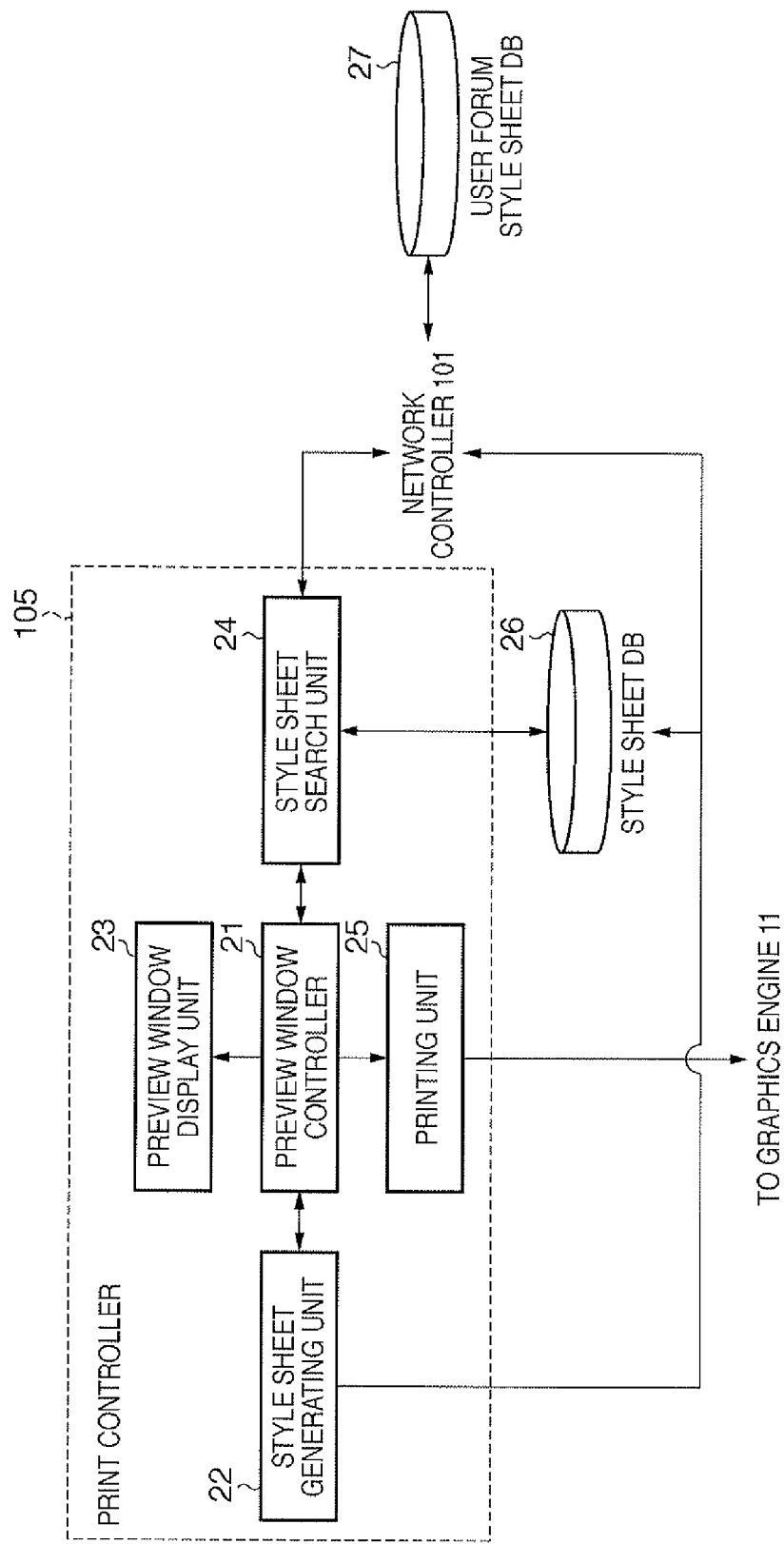
FIG. 4 is a block diagram showing an internal system of a print controller 105.

FIG. 4: Detailed Description of Print Controller 105

FIG. 4 is a block configuration diagram representing an internal system of the print controller 105. A preview window controller 21 plays a role of managing input and output with respect to a print preview window. A style sheet generating unit 22 is a component that generates a style sheet for realizing a desired print layout in response to a request from the preview window controller 21. A preview window display unit 23 generates and displays a print preview window, a rearranged print preview window, thumbnail images serving as print layout candidates, and the like. Displayed windows will be discussed in detail later. A style sheet search unit 24 searches for and acquires style sheet data from a style sheet DB (database) 26 and a user forum style sheet DB 27. A printing unit 25 is a component that applies a style sheet to a Web page and performs a printing process via a graphics engine. The style sheet DB 26 is a database that resides on a hard disk in the computer 1, and is for saving style sheets. Also, the user forum style sheet DB 27 is a database located in a server on the Internet 2 accessible via the network controller 101. Style sheets generated by a user are saved in association with information such as the URLs of printed Web pages and creation dates/times in both the databases 26 and 27. The record format in the databases and the role played by the databases will be discussed later.

Figure 5:
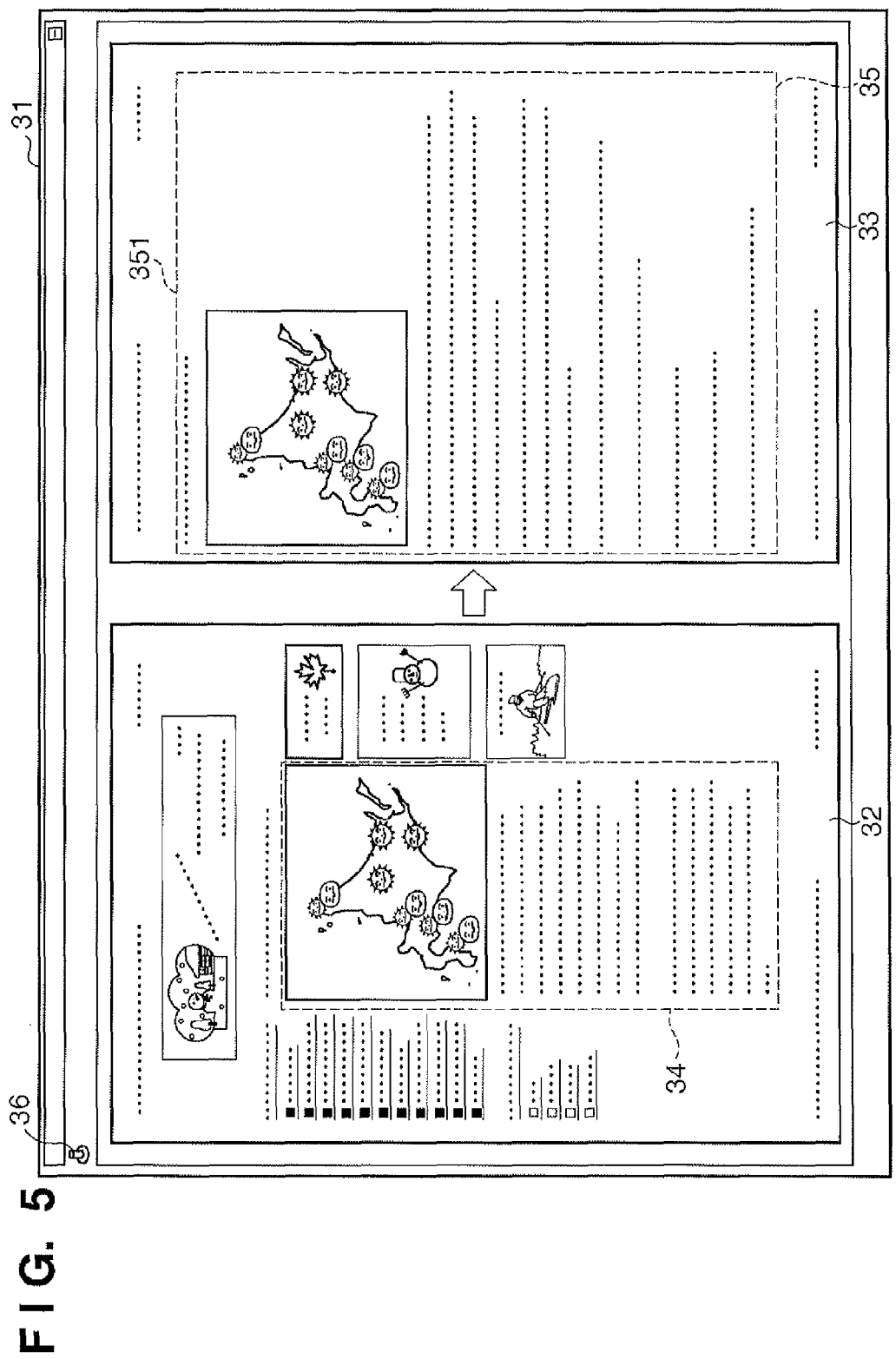
FIG. 5 shows an example of a print preview window.

FIG. 5: Description of Screenshot of Print Preview Window

Figure 1:
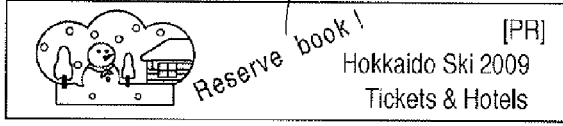
FIG. 1 shows an example multi-column Web page.
Figure 2:
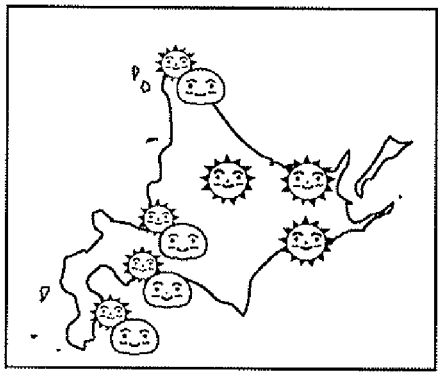
FIG. 2 shows an example page for printing.

FIG. 5 shows an example of a print preview window displayed by the print controller 105. Here, assume the case where an easily viewable page for printing such as FIG. 2 has not been prepared with respect to a Web page such as shown in FIG. 1. Hereinafter, an operation method for when the user performs printing after rearranging an existing print layout that is not easily viewable such as FIG. 1 into a print layout that is easily viewable such as FIG. 2 will be described.

The input controller 104 of the Web browser 10 displays a print preview window 31, in the case where an instruction to display a print preview window of the Web page currently being displayed is received. The print preview window 31 is divided into the two areas of the left side and the right side, and an original preview image 32 and a re-laid out preview image 33 are respectively displayed on the left side and the right side. The original preview image is a preview image of the case where the displayed Web page is printed without modification. In contrast, the re-laid out preview image is a preview image of the case where the Web page is rearranged according to the user's preference. In the example in FIG. 5, the re-laid out preview image 33 is displayed on the right side, but in an initial state, a blank preview image, that is, a state where nothing is to be printed is displayed.

Here, with the selection of an area targeted for printing, a portion that the user wants to print from the original preview image 32, such as an area 34 on the Web page, for example, is selected by the user with a mouse cursor or the like. Note that an area on a Web page as referred to here is a unit of description written using an HTML element, rather than merely referring to an area that is displayed, and, hereinafter, may also be called a part or an object. While this will be discussed in detail later with reference to FIG. 7, a part in the present example is an element or a group of elements organized using "elements for organizing elements".

The rearrangement of a part thus selected (selected part) is performed by dragging and dropping the selected part (e.g., area 34) in the preview image 33 on the right side with a mouse.

While the various parts of a Web page are displayed in the preview image 32, any part can be selected and dragged and dropped in the preview image 33 if displayed in the preview image 32. Once the selected part has been dragged and dropped in the preview image 33, a copy 35 of the selected part is created and displayed on the preview image 33. This preview image 33 is set as the print target.

Further, the copy 35 of the selected part can be resized, by the user grabbing and dragging a frame 351 (displayed with a dotted line in FIG. 5) of the copy 35 of the selected part with a mouse cursor, for example. In the case where text is included in the selected part 34, and the text does not fit on one line and is returned in accordance with the width of the frame, the return position shifts in accordance with an increase in the width of the copy 35 of the selected part. Layout can thereby be performed so as to display a large number of characters on one line. Further, the copy 35 of the selected part can also be repositioned by holding the middle, for example, of the copy 35 of the selected part and dragging the copy around in the image 33, for example.

Note that because the operations for selecting and rearranging parts can be repeated any number of times, it is also possible to print the preview image 33 after arranging a plurality of parts therein. Selected parts can also be deleted from the preview image 33. When the print layout has been decided, the user is able to print the preview image 33 from the printer 3 by pressing a print button 36.

FIG. 7: Schematic View of Erasing Unnecessary Parts and Performing Re-Layout Using a Style Sheet Next, the operations by the user illustrated in FIG. 5 will be described in association with corresponding processing in the print controller 105. Before that, firstly a style sheet will be described. FIG. 7 is a schematic view representing the mechanism that enables a part that the user wants to print to be selected and rearranged.

A pre-rearrangement Web page 41 is constituted by parts 42 to 45. With the HTML language, "elements for organizing elements" such as <div/> and <span/> are defined, and an ID attribute (unique identifier of each part) can be assigned to each element. A "part" in the present embodiment refers to an element or a group of elements organized by these "elements for organizing elements". In FIG. 7, parts having the IDs "header", "navigation", "sponsored", "contents" are included. These parts each include elements describing the designation of text and images, the arrangement thereof, and the like. The ID attributes of these <div/> elements (and also <span/> elements that are not shown) can be referred to from a style sheet or a script associated with the Web page, and are used as part names, so to speak, constituting the Web page. A Web page 41 in FIG. 7 is constituted by referring to the ID attributes "header", "navigation", "sponsored", "contents" of the <div/> elements in this way. A rearranged Web page 46 to which a style sheet has been applied is configured so as to display only the <div/> element of the ID attribute "contents" out of these ID attributes.

FIG. 8: Example Style Sheet

FIG. 8 shows an example style sheet. A style sheet is a format for controlling the appearance of the background, text and layout of a Web page. While the details of the format will be omitted, the example in FIG. 8 is an example style sheet 48 for realizing the Web page 46 in FIG. 7. With the style sheet 48, the elements having the IDs "header", "navigation" and "sponsored" are hidden using the description {display:none;}. On the other hand, the element having the ID "contents" represents, with the description {width: 100%}, an instruction relating to display and layout, such that the width of the part is set to 100% with respect to the width of the area in which the part is arranged. Once the style sheet 48 of the present example has been associated with the Web page 41 in FIG. 7, parts 42, 43 and 45 having the IDs "header", "navigation" and "sponsored" will be hidden. On the other hand, the Web page is converted to a layout in which a part 47 having the ID "contents", which is designated to be displayed at 100%, occupies the full width of the page. As a result, a new Web page 46 whose parts have been rearranged is generated as an image and displayed. In this way, using a style sheet enables the appearance to be modified without modifying the original Web page.

Figure 6A:
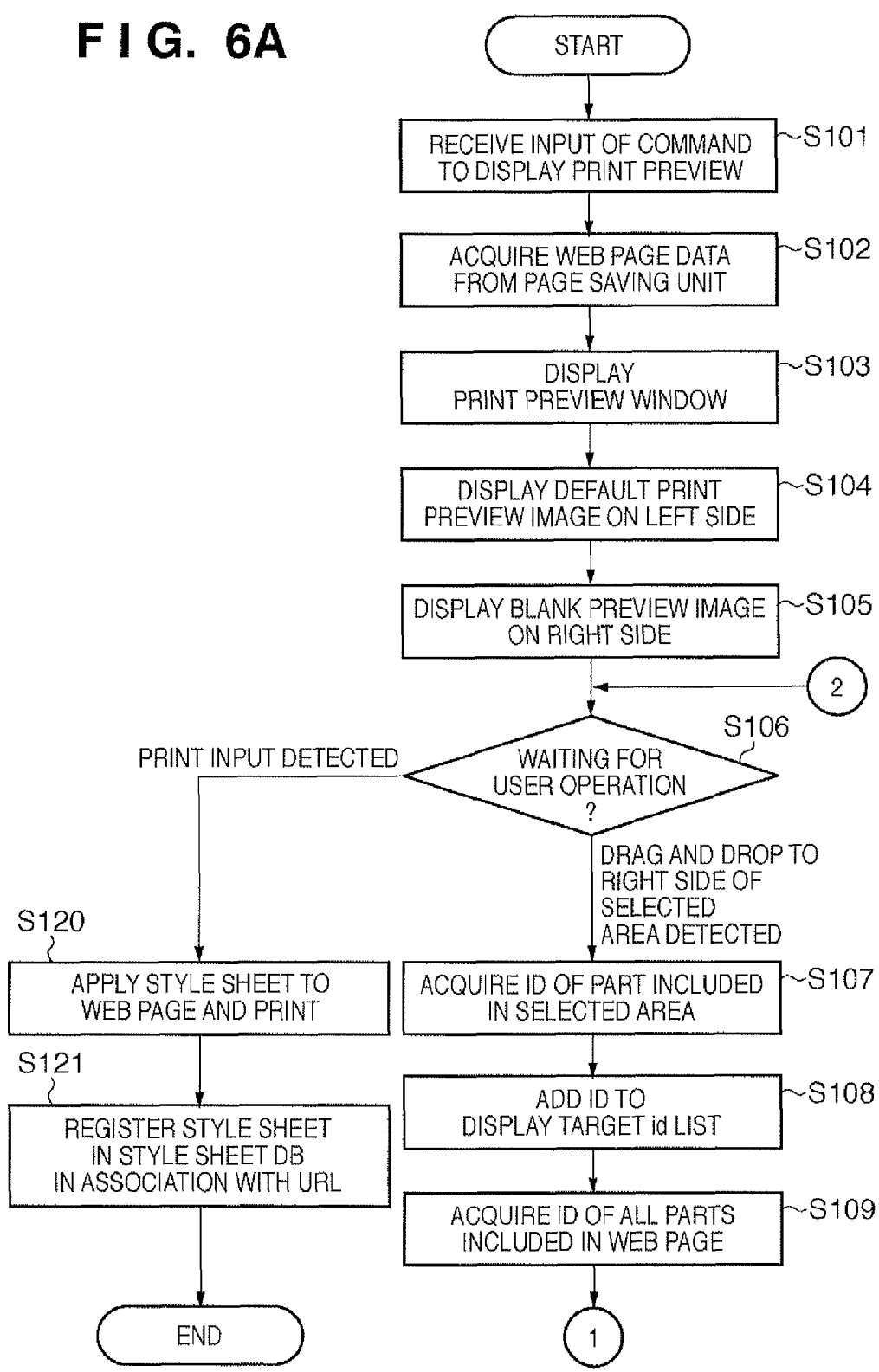
FIGS. 6A and 6B are flowcharts showing a processing flow of preview display, re-layout and printing.
Figure 6B:
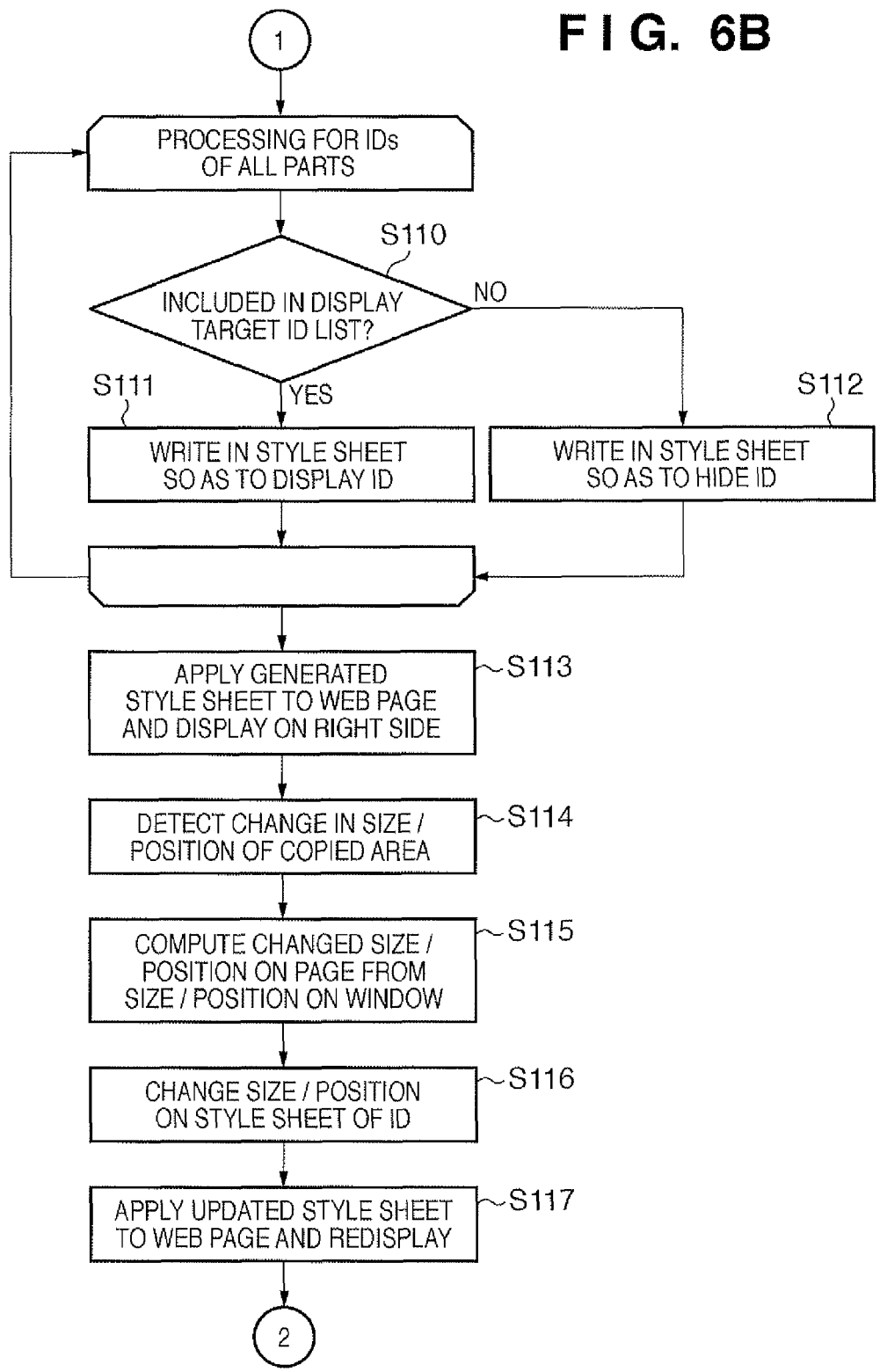

FIGS. 6A and 6B: Processing Flow of Preview Display, Re-Layout, and Printing

Next, the operations by a user illustrated in FIG. 5 will be described using FIGS. 6A and 6B, in order to associate these operations with corresponding processing in the print controller 105. FIGS. 6A and 6B are flowcharts showing a processing flow of preview display, re-layout and printing by the print controller 105. Note that the flowcharts of the present application are realized by the CPU 1701 in FIG. 17 executing associated programs. Also, the procedure in FIGS. 6A and 6B is started in a state where the Web browser 10 has already been executed, a designated Web page has been acquired from a Web server, saved and displayed, and the print controller 105 is waiting for input.

Firstly, in step S101, the preview window controller 21 receives input of a command to display a print preview of the Web page currently being displayed on the page display unit 103. This command is input in response to an instruction from the user, for example. Next, in step S102, the preview window controller 21 acquires the data of the currently displayed Web page from the page saving unit 102, and transmits the data to the preview window display unit 23. Next, in step S103, the preview window display unit 23 generates and displays the print preview window 31.

Next, in step S104, the preview window display unit 23 interprets the Web page data acquired from the page saving unit 102, and displays a print preview image 32 tailored to the Web page data on the left side of the print preview window 31. In step S105, the preview window display unit 23 displays a blank preview image, which is the initial state of the re-laid out preview image 33, on the right side of the print preview window 31. Next, in step S106, the preview window controller 21 waits for input of an operation by the user, and, if input is received, branches according to the instruction content. That is, the preview window controller 21 receives a parts rearrangement instruction resulting from a drag-and-drop operation by the user, determines the content of the received instruction, and branches according to the content. The preview window controller 21 branches to step S107 if it is detected that a part on the preview image 32 that the user wants to print has been selected by the user using a mouse, for instance, and dragged and dropped in the preview image 33. On the other hand, the preview window controller 21 branches to step S120 if input to the print button 36 is detected.

Once a rearrangement instruction has thus been received, the part that has been dragged and dropped is displayed in the preview image 33 on the right side, as a result of the next steps S107 to S113. In step S107, the preview window controller 21 analyzes the description of the element written in HTML language in the selected part that has been dragged and dropped, and acquires the ID of the part included therein. With the drag-and-drop function provided by the operating system, various formats are supported in terms of the format of objects to be dragged, and the HTML format is supported as one of those. Once a part (object) in HTML format has been dragged and dropped, it is possible, in the window in which the part was dropped, to acquire a source code of the HTML language of the part.

The preview window controller 21 analyzes the contents of the HTML language thus dropped, and extracts the ID attribute of the <div/> or <span/> element. In the case where a plurality of IDs are located in the HTML source code of the selected part, these are all acquired. Next, in step S108, the style sheet generating unit 22 receives the ID acquired at step S107 from the preview window controller 21, and adds the ID to a display target ID list. The display target ID list is a list held in memory by the preview window controller 21, and is used for managing information on parts displayed in the rearranged print preview image 33 on the right side.

Because the number of parts displayed in the preview image 33 increases as the result of user operations, the display target ID list is updated each time. Next, in step S109, the style sheet generating unit 22 this time analyzes the currently displayed Web page acquired from the page saving unit 102, and acquires the IDs of all parts. From the next steps S110 to S112, the processing is repeatedly performed for all parts in the Web page whose IDs were acquired at step S109.

In step S110, the style sheet generating unit 22 focuses sequentially on the IDs of the parts acquired from the Web page at step S109, and determines whether the ID of the part focused on exists in the display target ID list. If the ID of the part focused on does exist in the list, the processing proceeds to step S111, and if the ID does not exist in the list, the processing proceeds to step S112. In step S112, the style sheet generating unit 22 writes the element (i.e., part) having that ID into the style sheet so as to be hidden. Specifically, the style sheet generating unit 22 adds description designating a display attribute such as "id{display:none;}" to the style sheet with respect to the element having that ID. A style sheet as referred to here is character string information held in memory by the style sheet generating unit 22, and is updated by steps S111 and S112 and by step S116 (discussed later). The content thereof is as illustrated in FIG. 8. Hereinafter, this style sheet in memory will be assumed to be the style sheet 48, along the lines of the schematic view in FIG. 8. On the other hand, in step S111, the style sheet generating unit 22 writes the element having that ID into the style sheet 48 so as to be displayed. In the case where an element is to be displayed, it is not necessary to explicitly specify a display attribute, unlike hiding an element, but because of the possibility of a display attribute being designated at step S116, the style sheet generating unit 22 writes only the ID into the style sheet 48, such as "id{ }", without providing a display attribute.

When steps S110 to S112 have been executed with regard to the IDs of all parts in the Web page, the processing proceeds to step S113. In step S113, the preview window controller 21 generates a print layout image by applying the style sheet 48 generated by the style sheet generating unit 22 in steps S111 to S112 to the Web page acquired at step S109, and displays the print layout image as the image 33. Here, with the print layout displayed in the preview image 33, parts that have not been selected and dropped at step S106 will all be hidden by the style sheet.

Next, if the Web part indicated by reference numeral 47 in the schematic view of FIG. 7 is repositioned or resized as a result of the user repositioning or resizing the window, the preview window controller 21, in step S114, detects the position or the size modified according to the operation. That is, the preview window controller 21 receives designation of the modified position or size. Next, in step S115, the preview window controller 21 converts the position or size on the window acquired at S114 to a position or size on the page. Specifically, the preview window controller 21 calculates the actual size or position on the page, from the relative positional coordinates in the preview image 33 representing the laid out page and the ratio of the size of the window of the preview image 33 and the actual size of the page. Next, in step S116, the style sheet generating unit 22 reflects information on the position or the size calculated at step S115 in a position or a size serving as a display attribute value of the ID of the part in the style sheet 48. Specifically, assume, for example, that an operation has been performed to move the position of the selected part to a position (15 pixels, 15 pixels) from the top left edge of the page, and make the horizontal width of the size the full width of the page. In this case, the preview window controller 21 sets the display attribute of an id1 corresponding to the part of the style sheet 48 to a value such as the following, for example.

id1{position:absolute;top:15px;left:15px;width:100%}

This is description that applies a modification in position and size corresponding to the above operation to the part.

Next, in step S117, the preview window display unit 23 again generates a print layout image by applying the style sheet 48 updated at step S116 to the Web page acquired at step S109, and displays the print layout image as the preview image 33. By reflecting the modification in position and size on the window in the style sheet and applying the updated style sheet to the Web page in this way, a print preview image that has been re-laid out without changing the content of the Web page can be obtained. After step S117, the processing returns to step S106, and the preview window controller 21 receives input of an operation by the user.

If input to the print button is detected at step S106, the printing unit 25, in step S120, prints the Web page to which the style sheet 48 obtained at step S117 has been applied, or prints a blank sheet in the case where no rearrangement operation has been performed. Normal browsers are equipped with a technique for printing a Web page, and this can be utilized without modification. Note that in order to prohibit printing of a blank sheet here, the preview window controller 21 can also be configured not to accept input to the print button in step S106 in the case of a blank sheet.

Finally, in step S121, the style sheet generating unit 22 saves the style sheet 48 generated at step S117 in the style sheet DB 26 in association with the URL of the printed Web page.

Note that at step S106 of FIG. 6A, it was disclosed that the only choice was between the rearrangement operation and the print operation, but other operations, such as cancellation of an operation, can of course be accepted. In that case, processing according to the operation can of course be executed.

According to the present embodiment as described above, the layout of a Web page can be easily modified.

FIG. 9: Example Style Sheet DB

FIG. 9 shows example records saved in the style sheet DB 26. The style sheet DB 26 includes "URL", "Style Sheet", "Creation Date/Time", and "Usage Frequency" as the fields of records. The URLs and style sheets are, as abovementioned at step S121, respectively the URLs of print target Web pages and style sheets 48 for realizing layouts in which parts to be printed have been selected and rearranged by the user himself or herself. The date and time at which step S121 was executed is saved as the creation date/time. As will be mentioned later with regard to the usage frequency, the number of times that a saved style sheet is used in printing the Web pages of URLs other than the URL saved in association with the style sheet is saved in this field.

This style sheet DB 26 is utilized when printing a Web page with the same or similar URL, in a Web site that has been printed with the procedures of steps S101 to S121. In other words, reducing the operation load of the user is realized by storing created style sheets so as to be usable when printing other Web pages.

Embodiment 2

Next, an embodiment 2 that expands on embodiment 1 will be described. Note that description of points in common with embodiment 1 will be omitted. The present embodiment is intended to enable re-layout when printing a Web page to be more easily performed, by effectively reusing style sheets registered in the style sheet DB 26. More specifically, a style sheet having an association with the displayed Web page, out of the style sheets registered in the style sheet DB 26, is displayed on a print preview window as a thumbnail. A style sheet having an association is a style sheet that was used for printing a Web page specified by a URL that includes the same server name, that is, the same domain name as the Web page that the user is trying to print.

The reason for this is that because an ID is assigned to each part in a Web page as shown in FIG. 7, and the creator will be the same if the Web pages belong to the same Web site, the naming rules of these IDs will often be the same. For example, with most news sites, the body, title, photographs and the like of news articles will be different for each Web page, but it is highly likely that they will all be configured by the same template, that is, by Web parts assigned with the same IDs. According, if in the Web pages are in the same Web site, it is highly likely that the layout can be modified in the same way, even if a style sheet corresponding to a give Web page is applied to a different Web page. Utilizing of this fact, style sheets and Web pages are associated by domain name. Then, by selecting one of the candidate thumbnails, a layout that uses a style sheet can be realized, without selecting or rearranging the parts of the Web page. Hereinafter, the processing and the like of the present embodiment will be described.

Figure 10:
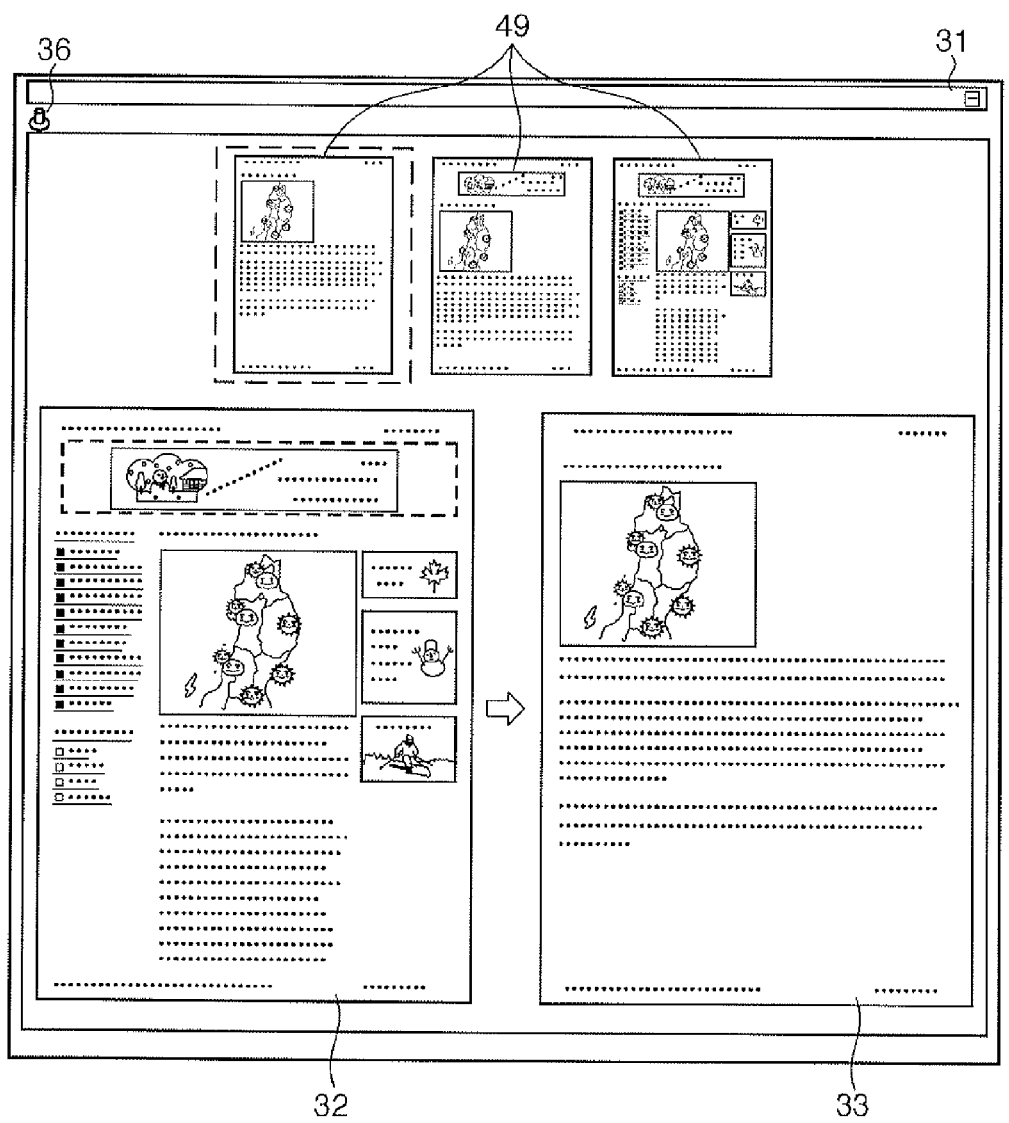
FIG. 10 shows an example of a print preview window on which candidate thumbnails are displayed.

FIG. 10: Description of Screenshot of Window Displaying Layout Candidate Thumbnails A window 31 in FIG. 10 is an example window where the user is able to choose and print a favored layout from among the candidates. Here, assume that the user has opened and is trying to print a Web page in the same Web site but with a different URL to the Web page printed in FIG. 5, that is, a Web page in which the domain name portion of the URL is the same. The role and arrangement of user interfaces such as the original preview image 32 on the left side, the print preview image 33 that the user would like to print on the right side and the print button 36 are unchanged from the example window shown in FIG. 5. A difference with FIG. 5 lies with candidate thumbnails 49 displayed at an upper part of the window. Candidate thumbnails 49 are displayed in the case where pages in the same Web site as the page that the user is currently trying to print have previously been printed.

The candidate thumbnails each correspond to a previous style sheet used in printing a page in the same Web site. Printing can be performed after applying a style sheet corresponding to the selected thumbnail to the current Web page by selecting one of these candidate thumbnails. The candidate thumbnails are arranged in order of decreasing usage frequency from the left, and if there are a plurality of candidates, the print preview image 33 is displayed as a result of having automatically selected and applied the style sheet on the far left with the highest usage frequency. In other words, the style sheets are displayed in order from the style sheet with the highest priority level. The user is able to directly press the print button 36 and print the print preview image 33 if he or she likes that print layout, and is also able to select a different candidate if he or she does not like that print layout. Of course, in order to make a new print layout that is completely different, the user may perform rearrangement in line with the flow shown in FIGS. 6A and 6B. For that purpose, a blank thumbnail may be added to the thumbnails displayed as candidates, or a button or the like for deleting all of the parts of the preview image 33 may be provided.

The work involved in rearranging the layout of a Web page is more or less predicable, such as deleting advertisements and navigation bars, and adjusting the width of the body, and the user's workload can be reduced by automatically saving and reusing such work content as style sheets.

Next, the flow of the abovementioned reuse of style sheets will be described using FIGS. 11A and 11B.

FIGS. 11A and 11B: Flow of Layout Candidate Application and Selection Process FIGS. 11A and 11B are flowcharts showing a flow of applying and printing a previous print layout using the style sheet DB 26. The flow from display of the preview window 31 to display of the default print preview image 32 on the left side performed by the preview window controller 21 from steps S201 to S204 is similar to steps S101 to S104.

In step S205, the style sheet search unit 24 acquires the URL of the Web page that the user is trying to print. Next, in step S206, the style sheet search unit 24 extracts the domain name portion from the URL acquired in step S205. For example, if the URL that the user is trying to print is "http://------.com/article/20081019aaa", the extracted domain name will be "------.com". In the next steps S207 to S208, the style sheet search unit 24 extracts the entries from the style sheet DB 26 one by one, and perform processing on each entry.

In step S207, the style sheet search unit 24 judges whether the URL of the entry extracted from the style sheet DB 26 includes the domain name portion extracted at step S206. For example, assuming that the URL that the user is trying to print is "http://------.com/article/20081020bbb", and that the URL of an entry saved in the style sheet DB 26 is "http://------.com/article/20081019aaa", the URLs will be different on comparison, but because the domain name portions are the same on comparison, the URL will be judged to include the same domain name portion. If the URL does include the same domain name, the processing proceeds to step S208, and if the URL does not include the same domain name, no further processing is performed on that entry, and the next entry is extracted, before the processing again proceeds to step S207.

Next, in step S208, the preview window controller 21 applies the style sheet of the entry to the print target Web site to create a thumbnail image to serve as a candidate. A candidate thumbnail image is small at around one third the size of the preview image 32 or the preview image 33, but enables the approximate arrangement of the Web parts to be distinguished despite being small.

When the above steps S207 and S208 have been performed with regard to all entries in the style sheet DB 26, the processing proceeds to step S209. Next, in step S209, the preview window display unit 23 determines whether there are one or more candidate thumbnail images created in step S208, and if there are, the processing proceeds to step S210. On the other hand, if there are not one or more candidates, the processing proceeds to step S105 illustrated in FIG. 6A, and subsequently becomes the flow in which the user himself or herself selects and rearranges the print target Web parts.

If there are one or more candidates, the preview window display unit 23, in step S210, displays the thumbnail images in a position at the top part 49 of the window, arranged from the left in descending order of the "usage frequency" recorded in the style sheet DB 26. If usage frequencies are the same, the thumbnail image with the most recent "creation date/time" may be displayed first, for instance. Also, all candidate thumbnail images, that is, the full number of style sheets found to correspond to URLs that have the same domain name may be displayed, or a limited number may be displayed, such as the top three. These candidate thumbnails not only represent an overview of the layouts, but also serve as input means that can be selected by a mouse or a keyboard.

Next, in step S211, the preview window display unit 23 sets the thumbnail furthest to the left side (thumbnail created from the style sheet used the most number of times) to a state of being selected as the default candidate. Further, in step S212, the preview window display unit 23 generates a print preview image by applying the style sheet selected at step S211 to the Web page, and displays the print preview image as the print preview image 33 on the right side of the window. The user himself or herself is able to switch to a desired layout by confirming and selecting a candidate thumbnail. However, the user's workload can be reduced as a result of the preview window display unit 23 performing the selection in advance, because of it being highly likely that the most used style sheet will be favored by the user.

Next, in step S213, the preview window controller 21 waits for input of an operation by the user from the input controller 104, and, if input is received, determines the operation content thereof. If input of a selection of a different candidate thumbnail from the user is detected, the processing branches to step S214. In step S214, the preview window display unit 23 generates a print preview image by applying the style sheet corresponding to the selected candidate thumbnail to the Web page, and displays the print preview image as the print preview image 33 on the right side of the window. The user is able to repeat step S214 until a favorable layout is found.

Next, in step S215, the preview window controller 21 determines whether the operation received at step S213 is input to the print button. The preview window controller 21, in the case of detecting input with respect to the print button 36, branches to step S216. In step S216, the printing unit 25 performs printing after applying the style sheet last selected at step S214 to the Web page. In step S217, the style sheet search unit 24 increases by one and saves a "usage frequency" counter of the entry that includes the style sheet used in printing, and updates the style sheet DB 26. If the operation received in step S215 is not input to the print button, the processing branches to step S106 in FIG. 6A. At step S106, the user is further able to edit the laid out preview image 33.

The chances of the style sheet selected from the candidates being used the next time printing is performed thereby increase. Note that in step S215, the other operations are all determined to be the shifting of parts, but the present invention is not limited to this, and the other operations can be determined with respect also to selection of a blank style sheet, cancellation of an operation, or the like, for example. Of course, if those operations are performed, processing tailored to those operations is executed.

In the present embodiment as described above, if a Web page in a given Web site has been rearranged and printed, it is subsequently possible to automatically print Web pages in the same Web site in a desired layout, without rearranging those Web pages. Also, if there are a plurality of layout candidates, a desired layout can be selected and printed from those candidates.

Embodiment 3

Next, the processing of a Web page printing apparatus according to an embodiment 3 of the present invention will be described using the flowchart of FIG. 12.

Figure 12:
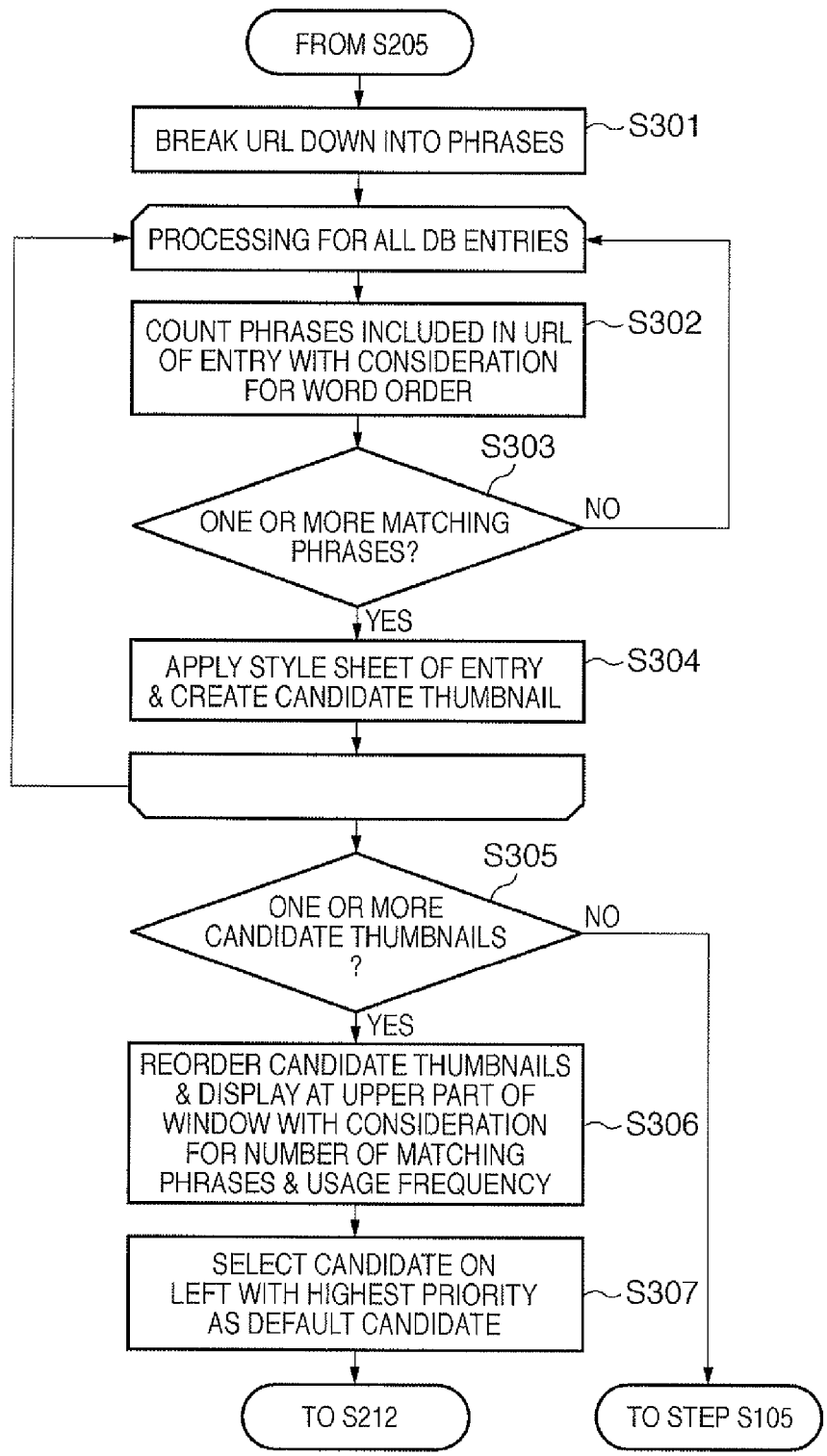
FIG. 12 is a flowchart showing a processing flow according to a second embodiment of the present invention.

FIG. 12: Processing Flow of Candidate Search by URL Comparison

In embodiments 1 and 2, whether the domain names of URLs are the same is used as a basis for applying a style sheet used in the print layout rearrangement of a given Web page to a different Web page. However, it is possible that, even with the same news site, for example, original layouts will differ greatly between the pages of individual news articles and gallery pages in which news photographs are collected or the pages of columns, and that the types of parts constituting Web pages will also differ. In such cases, a way of picking a style sheet that best suits the Web page that the user is trying to print, from among style sheets associated with the same domain, is required.

In view of this, in the present embodiment, means for selecting the optimum style sheet by comparing URLs in detail will be discussed. In the present embodiment, the configuration is unchanged from embodiment 2, but the processing from steps S206 of FIG. 11A to S211 of FIG. 11B discussed in embodiment 2 is replaced with processing from steps S301 to S307.

FIG. 12 shows a flowchart representing the processing from steps S301 to S307. The processing of the present embodiment replaces steps S206 in FIG. 11A to S211 in FIG. 11B with these steps S301 to S307.

Firstly, in step S301, the style sheet search unit 24 extracts a pathname portion together with the domain name portion of the URL of the Web page that the user is trying to print, and further extracts one or more phrases, using slash symbols included in the pathname as delimiters. For example, in the case where the URL of the Web page is "http://------.com/article/20081020bbb", the domain name portion is "------.com" and the pathname portion is "article/20081020bbb". Further, when the pathname is broken down using the slash symbols as delimiters, the two phrases "article" and "20081020bbb" are extracted. Note that hereinafter, because the pathname portion, when viewed in terms of the whole URL, can also be taken as a single phrase partitioned by slash symbols, the phrases constituting the pathname and the domain name portion will both be treated as "phrases" without distinguishing between them.

In the next steps S302 to S304, the style sheet search unit 24 extracts the entries from the style sheet DB 26 one by one, and performs processing on each entry. In step S302, the style sheet search unit 24, with reference to the URL of the entry extracted from the style sheet DB 26, counts how many of the phrases extracted at step S301 are included, taking the word order into consideration, and stores the number of matching phrases in association with the entry. The counting method of this step S302 will be described using an example.

For example, in the URL "------.com/photonews/200804" of entry #1 in the style sheet DB 26 shown in FIG. 9, firstly the first phrase "------.com" (domain name), is included, but because the remaining phrases "article" and "20081020bbb" are not included, the number of matching phrases is "1". With the method of counting matching phrases, the counting ends at the point at which a phrase that does not match appears, because of taking into consideration the order, namely, first phrase, second phrase, and so on. Further, with regard to the URL "------.com/article/20080320aaa" of entry #2 as an example, because the two phrases "------.com" and "article" are included in order, the matching number is "2".

Next, in step S303, the style sheet search unit 24 judges whether the number of the phrases counted at step S302 is one or more. If one or more, the processing proceeds to step S304, and if not one or more, no further processing is performed on that entry, and the next entry is extracted, before the processing again proceeds to step S302.

In the next step S304, the preview window controller 21 creates a thumbnail image to serve as a candidate by applying the style sheet of the entry to the Web page. Next, in step S305, the preview window display unit 23 determines whether there are one or more candidate thumbnail images created in step S304, and if there are, the processing proceeds to step S306. On the other hand, if there are not one or more candidate thumbnail images, the processing proceeds to step S105 illustrated in FIG. 6A, and subsequently becomes the flow in which the user himself or herself selects and rearranges the print target Web parts, similarly to the first embodiment.

In the case of there being one or more candidates, the preview window display unit 23, in step S306, reorders the thumbnail images, with the number of matching phrases counted at step S303 as a first basis and the usage frequency of entries as a second basis, and displays the thumbnail images in a position at the top 49 of the window. In embodiment 1, candidates were reordered on the basis of only the usage frequency of entries, but in embodiment 3, candidates are reordered with preference given more to the number of matching phrases at step S303.

For example, entries #1, #2 and #4 are chosen as candidates with one or more matching phrases, from among the entries in the style sheet DB 26 of FIG. 9. When they are reordered on the basis used in embodiments 1 and 2, the order will be entries #1, #4 and #2 in descending order of usage frequency, but when the entries are reordered in accordance with the basis of the present embodiment, the order will be entries #2, #1, and #4. The reason being that since the URL of entry #2 out of the three entries serving as candidates is "http://------.com/article/2008320aaa", the two phrases "------.com" and "article" match the URL "http://------.com/article/20081020bbb" of the Web page that the user is trying to print. In contrast, because the URLs of entries #1 and #4 have only one matching phrase, that is, the domain name, the priority of these entries is lower than entry #2. In the case where the number of matching phrases is the same, as with entries #1 and #4, entry #1 will have a higher priority than entry #4 because usage frequency is used as the next basis.

Finally, in step S307, the preview window controller 21 sets the thumbnail on the left side that was reordered after being judged to have the highest priority to a state of being selected as the default candidate. Since the URL of entry #2 furthest to the left is similar to the URL of the Web page that the user is trying to print, it is all the more likely that the configuration of the Web page and, further, the naming rules with respect to the Web parts will be similar compared with when only the domain name matches. Thus, it can be said that it is also more highly likely that the Web page that the user is trying to print will be converted to a print layout desired by the user, when the style sheet of entry #2 is applied.

As a result of the processing in the above described steps S301 to S307, it is highly likely that an optimum style sheet will be automatically applied to the Web page that the user is trying to print, further enabling to the user's workload to be reduced.

Embodiment 4

Figure 13:
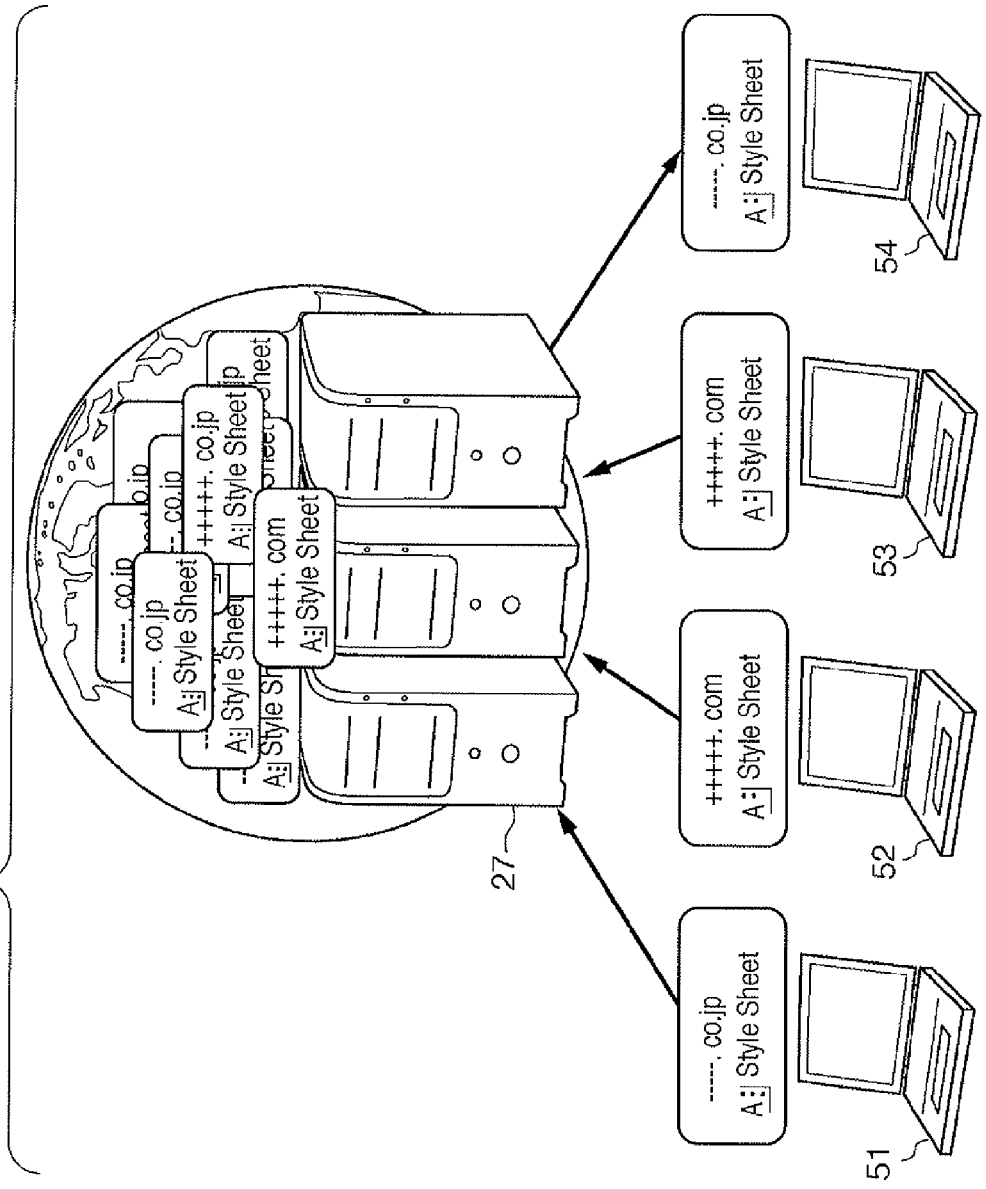
FIG. 13 is a conceptual view of a user forum style sheet DB according to a third embodiment of the present invention.

FIG. 13: Conceptual View of User Forum Style Sheet DB

Next, a Web page printing apparatus according to an embodiment 4 of the present invention will be described using the conceptual view of FIG. 13. In embodiments 1 and 2, the style sheet DB 26 that is local to the computer 1 was used as a destination for recording style sheets including rearranged layout information and searching for previously registered style sheets. However, since a corresponding style sheet is not registered unless a Web page is printed by the user, the problem remains of the user not being presented with candidates and having to perform rearrangement, in relation to a Web page that is being visited for the first time or a Web page that is being printed for the first time.

In view of this, in embodiment 4, a method of presenting print layout candidates, by making use of the style sheets of other users stored in the user forum style sheet DB 27 on the Internet 2, will be discussed. FIG. 13 is a schematic view representing the user forum style sheet DB 27 being used by a plurality of users. Note that while reference numerals such as S401, S402 and S40X will appear in the following description, these are merely to facilitate the description and are not intended to refer to the drawings.

Computers 51, 52, 53 and 54 are computers that are each equipped with the Web page printing apparatus of the present invention, and a user of each computer prints Web pages using the present printing apparatus. These computers are all in a state of being communicable with the user forum style sheet DB 27 via the Internet 2. The user forum style sheet DB 27 is in actual fact a database server, and may have a single server configuration or a configuration extended by a plurality of servers. Also, the format of database records held by the user forum style sheet DB 27 is the same format as the local style sheet DB 26.

In step S121 of embodiments 1 and 2, the style sheet generating unit 22 registers the style sheet that was used in the style sheet DB 26 in association with the URL of the page that was printed, after printing the Web page. In the present embodiment, after this S121, the style sheet generating unit 22 further saves the style sheet in the user forum style sheet DB 27 in association with the URL via the network controller 101 (step S401). Once processing of this step S401 has been executed a plurality of times in the computer 51, 52 and 53, for example, a large number of entries will have been saved to and stored in the user forum style sheet DB 27.

Because the users of the computers print various Web pages of various Web sites, there will be many kinds of saved URLs and style sheets associated with these URLs. Here, next assume that another computer 54 has opened the print preview window 31 in order to print a given Web page. In embodiment 3, style sheets to serve as candidates were retrieved from only the local style sheet DB 26, but in the present embodiment, style sheets to serve as candidates are also retrieved from the user forum style sheet DB 27.

That is, the style sheet search unit 24 also performs the processing from step S205 to S211 for searching the local style sheet DB 26 and displaying candidates with regard to the user forum style sheet DB 27, via the network controller 101 (S402). As a result of this processing of S402, the possibility exists of being able to borrow and use style sheets created by other users by searching the user forum style sheet DB 27, even if style sheets to serve as candidates are not found in the local style sheet DB 26. The possibility of finding a style sheet that corresponds to the Web page that the user is trying to print with the processing of step S402 is small when there are few computers that perform the registration process of S401, but increases as the number of computers increase to a few dozen, or a few hundreds, or an unspecified number.

In the case where printing has been performed using a style sheet retrieved with the user forum style sheet DB 27, the style sheet search unit 24 increases by 1 and saves the usage frequency of the corresponding style sheet via the network controller 101 (step S403). Because a style sheet whose usage frequency is increased by this step S403 is preferentially displayed on the left side when displayed as a candidate at step S402, the possibility of this style sheet being further used numerous times as a "popular" style sheet increases. Note that in the case where style sheets to serve as candidates are found in both the local style sheet DB 26 and the user forum style sheet DB 27 in step S402, various bases are conceivable as a way of reordering these candidates. For example, the candidates may simply be reordered on the basis of usage frequency, or candidates found in the local style sheet DB 26 may be preferentially displayed to the left side of candidates found in the user forum style sheet DB 27, even if the usage frequency is less.

As a result of the above-described processing from steps S401 to S403, a layout suitable for printing can be borrowed and the Web page printed, by utilizing the possibility of there being someone who has performed printing even if the user himself or herself has not performed printing, enabling the user's workload to be reduced.

Embodiment 5

Figure 14:
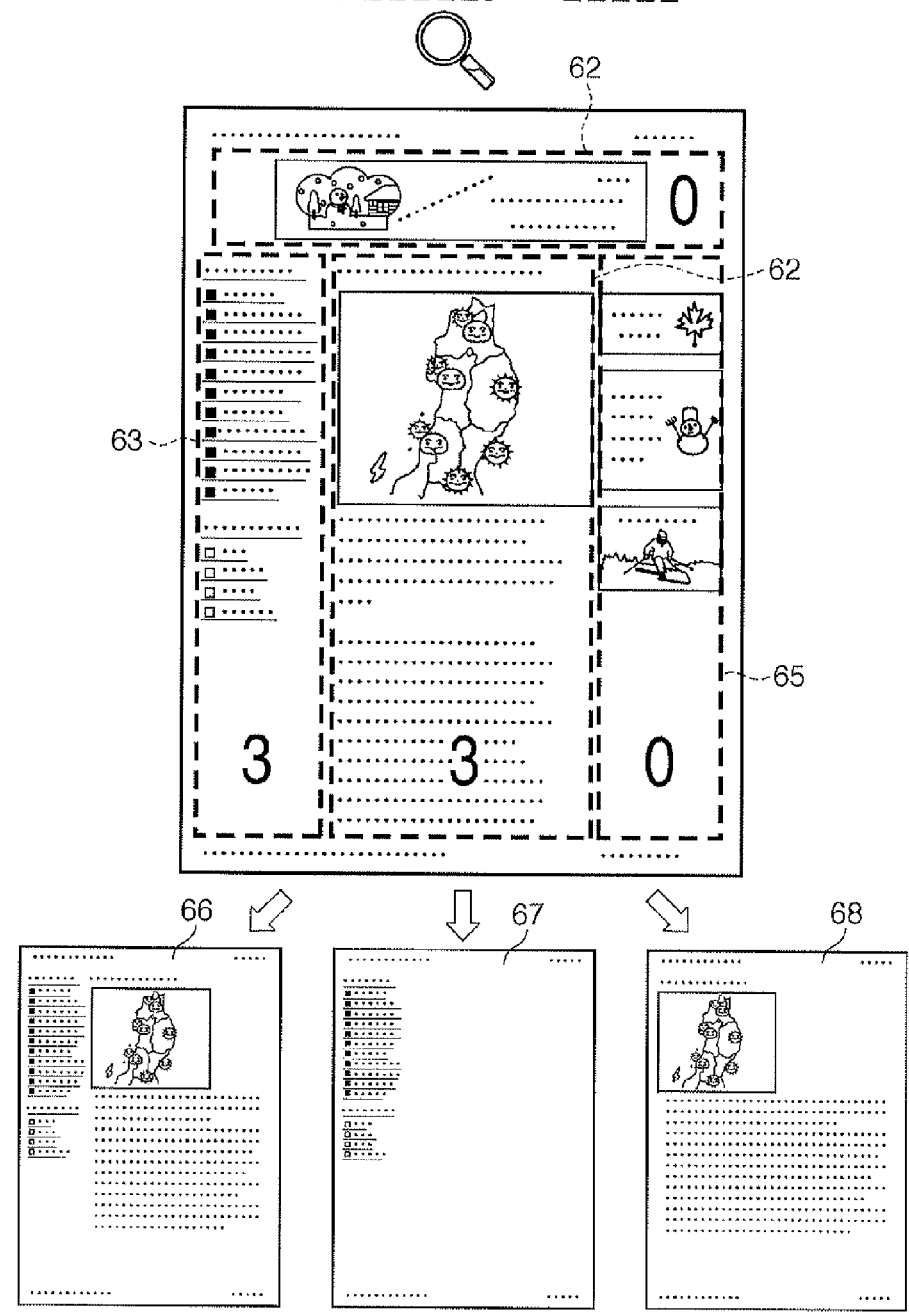
FIG. 14 is a conceptual view of a process of automatically performing layout from a page title according to a fourth embodiment of the present invention.

FIG. 14: Conceptual View of Auto-Layout Function

Next, a Web page printing apparatus according to an embodiment 5 of the present invention will be described using FIGS. 14 and 15. In Embodiment 4, means for an unspecified number of users being able to retrieve an optimum style sheet from the user forum style sheet DB 27, even if there is not a suitable style sheet in the local style sheet DB 26, was discussed. However, in the case where a suitable URL is also not registered in the user forum style sheet DB 27, that is, in the case where the user is trying to print a page that nobody has ever printed, the user will have to rearrange the print layout manually.

In view of this, in embodiment 5, a method of automatically generating a layout suitable for printing from a title given to the Web page, even if a style sheet registered in a database in advance is not found, will be discussed.

FIG. 14 is a conceptual view representing an overview of the present embodiment 5. A title 61 is an example title of a Web page that the user is trying to print. An element <Title/> for deciding the page title is defined in HTML language. The page title is, as the name suggests, a title succinctly representing a given Web page, and is normally displayed on a title bar or tab sheet of a Web browser, and used as a default title of a bookmark. Since it is extremely highly likely that a keyword included in this title will have an association with the content written in the body of the Web page, it can be said that there is a possibility of being able to judge a Web part to be printed from the keyword in the title, and conversely to eliminate unnecessary parts with loose associations.

In view of this, the Web page is searched in relation to terms constituting the title such as shown in the title 61, and the places where terms appears are counted for each Web part. With the example in FIG. 14, the case is shown where, out of parts 62 to 65, three terms respectively appear in parts 63 and 64, and none of the terms appear in the parts 62 and 65. As a result, layout is performed by combining the parts so as to include either or both of the parts 63 and 64, and thumbnails thereof are presented to the user as candidate layouts 66, 67 and 68.

It is possible that none of these layouts 66, 67 and 68 will be a layout that the user hoped for. However, because there is a good chance of there at least being a layout from which Web parts not required in printing have been eliminated, it is worth choosing this layout as a candidate when an existing style sheet cannot be used. Hereinafter, the processing for finalizing the layout automatically as shown in this conceptual diagram will be described in detail.

Figure 15:
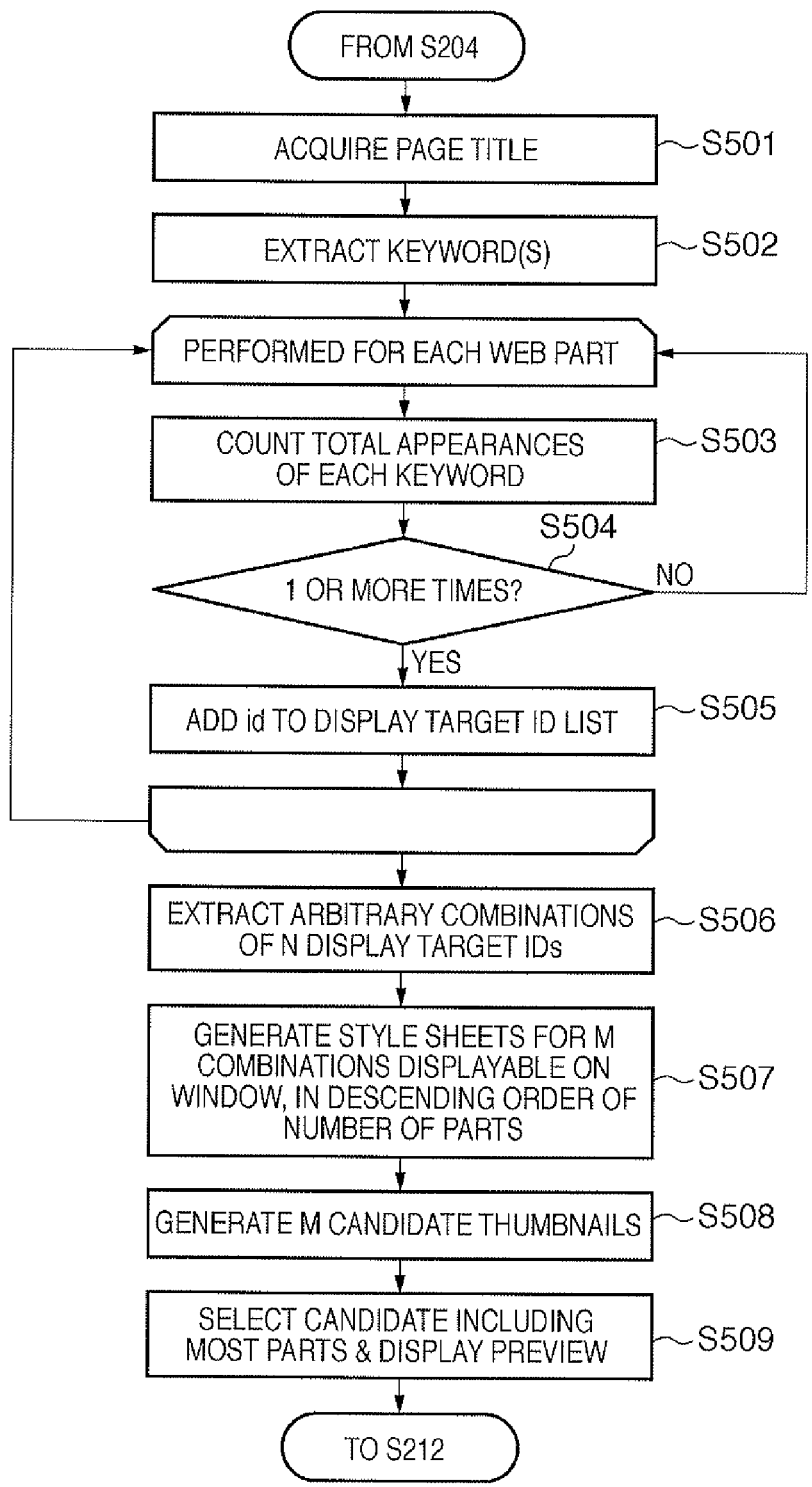
FIG. 15 is a flowchart showing a processing flow of automatically performing layout from a page title.

FIG. 15: Flow of Auto-Layout Function

FIG. 15 is a flowchart showing processing by the Web page printing apparatus according to embodiment 5. The processing of the present embodiment is intended to replace steps S205 to S211 of embodiment 2. Alternatively, in embodiment 4, steps S401 and S402 are replaced by FIG. 15.

Firstly, in step S501, the preview window controller 21 acquires the title from the Web page data. The title is contained in the <Title/> element, as discussed previously.

Next, in step S502, the preview window controller 21 extracts keywords from the title acquired at step S501. As upstream processing of the keyword extraction, natural language processing is performed to divide the title into units of terms, in the case where, unlike English, breaks in the terms cannot be mechanically judged, such as when the language of the title is Japanese or Chinese. As for the method of extracting keywords from the terms, various methods are conceivable such as choosing only proper nouns, or also including common nouns while excluding only particles, prepositions and the like. In the present example, "weather", "forecast" and "Tohoku" are treated as keywords, excluding only the preposition "for" from the title 61 shown in FIG. 14.

In the next steps S503 to S505, processing is performed with regard to the Web parts included in the Web page. In step S503, the preview window controller 21 counts the number of times each of the extracted keywords appears in the Web page, and derives a total. In the case where a given keyword appears a plurality of times, the full number of appearances may be counted, or the plurality of appearances may only be counted as one appearance. Also, in the case where proper nouns appear, a single appearance may be weighted to count for a plurality of appearances. Note that when searching the HTML data of a Web page, only the actual text characters appearing in the window may be set as the search target, or text and the like contained in ALT attribute data representing notes on the image data may also be included as the search target.

Next, in step S504, the preview window controller 21 judges whether the total counted is one or more, and if one or more, proceeds to S505, and if not one or more, performs no further processing on that part, and again performs the processing of S503 with regard to the next part. In step S505, the preview window controller 21 adds the ID of the Web part to the display target ID list. The total number of times each keyword appears in each part is derived by repeating the above steps S503 to S505 in relation to all Web parts, and one or more parts are stored as display targets.

Next, in step S506, the style sheet generating unit 22 extracts arbitrary combinations from the stored one or more display target IDs. Arbitrary combinations indicates three combinations (AB), (A) and (B) when two parts A and B are display targets, and seven combinations (ABC), (AB), (BC), (CA), (A), (B), and (C) when three parts A, B and C are display targets, for example. The number of combinations when n parts are display targets will be $2^N-1$.

Next, in step S507, the style sheet generating unit 22 chooses a maximum of M candidates that can be displayed in the window in descending order of the number of parts included therein, from all of the combinations derived at step S506, and generates corresponding style sheets. When the number of candidate thumbnails that can be displayed on the print preview window 31 is M, the style sheet generating unit 22 chooses M combinations in descending order of the number of parts included therein, from the combinations of parts. Descending order of the number of parts included therein means in descending order of the combinations having a large number of parts, such as (ABC), (AB) and (BC) in the case of there being three parts A, B and C, for example. The reason for doing this is to ensure that as many Web parts in which keywords are located are printed as possible. Of course, combinations may be chosen or reordered in accordance with another basis as necessary, such as in ascending order of the number of parts.

Next, in step S508, the preview window controller 21 applies the M style sheets generated in step S507 individually to the Web page that the user is trying to print, and obtains thumbnail images. Finally, in step S509, the preview window display unit 23 displays the candidate thumbnail images from the left in the print preview window 31 in descending order of the number of parts included therein, selects the candidate furthest to the left, and displays the selected candidate in the corresponding print preview image 33.

As a result of the above processing, a print layout approximating the user's preference can be automatically generated, even in the case where a suitable style sheet does not exist, enabling the hassle involved in deleting unnecessary parts such as advertisements to be reduced.

Embodiment 6

Figure 16:
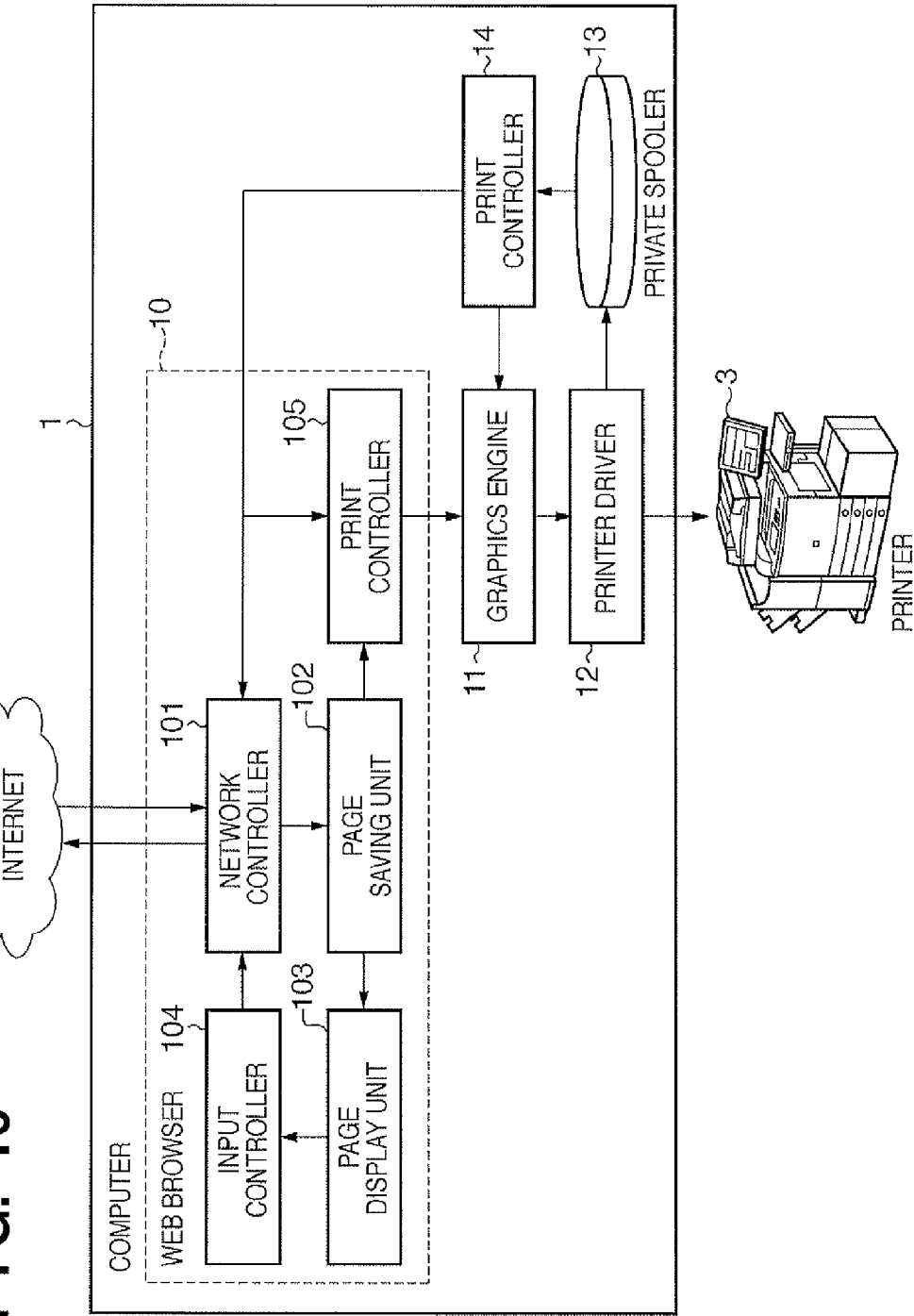
FIG. 16 is a block diagram showing a system configuration according to a fifth embodiment of the present invention.

FIG. 16: Embodiment with Printer Driver

Finally, a Web page printing apparatus according to an embodiment 6 will be described using FIG. 16. With the aforementioned first to fourth embodiments, the print controller 105 which undertook the core processing of the Web page printing apparatus of the present invention was a component incorporated in advance in the Web browser 10 or a plug-in added later. In embodiment 6, the case is shown where a similar effect is obtained even if this print controller is constituted as part of the functions of the printer driver 12.

FIG. 16 is an example in which a print controller is also added as part of the printer driver 12, in addition to the print controller 105 of the Web browser 10. A private spooler 13 is a component that temporarily saves rendering commands input to the printer driver 12 in an intermediate format before being converted to PDL. Reference numeral 14 is the print controller.

In embodiment 1 to embodiment 5, the print controller 105 receives input of Web page data to be printed from the page display unit 103 of the Web browser 10, whereas the print controller 14 of the present embodiment receives input of data to be printed from the private spooler 13. The fact that the print controller 14 communicates via the network controller 101, and performs print output to the graphics engine 11 is unchanged from embodiment 1 to embodiment 5.

Incidentally, with a general printing system, components from the applications to the printer serving as the output destination form a linear configuration, but with the present embodiment, the graphics engine 11, the printer driver 12, the private spooler 13 and the print controller 14 form a loop configuration. This is to enable the print layout and print settings to be changed by temporarily holding data to be printed in the computer, rather than it being output for printing to the printer 3 immediately after the user has given the instruction for printing. That is, the intermediate format saved in the private spooler 13 via the printer driver 12 is read by the print controller 14, and the user is able to input an instruction to change the print layout via a user interface displayed by the print controller 14.

Further, the print controller 14 performs layout of the intermediate format based on an input change instruction, and re-outputs a rendering command to the graphics engine 11 again. When re-outputting a rendering command from the print controller 14, information instructing that this is the "second round of printing" is included in the rendering command, so that the processing does not loop endlessly.

Here, in order to rearrange a print layout, which is a main focus of the present invention, in the print controller 14, the intermediate format saved in the private spooler 13 needs to be converted to HTML format, which is an actual Web page, or a format approaching HTML format. As an example, EMF (Enhanced Meta File) format conventionally used with Microsoft Windows®, being a primitive format specifically designed for rendering, is not suited, but XPS (XML Paper Specification) supported by Windows Vista® is suitable. With the XPS format, the rendering information of a page is written in XML markup, and much information apart from rendering information can also be represented. For example, it is possible to define parts constituting a Web page by hierarchizing XML markups and compiling a number of pieces of rendering information, and to also define layout information relating to each part separately from page information. Further, URL information on Web pages that is necessary in the present invention and page title information can also be defined in XPS data.

As discussed above, even in a printing system such as shown in FIG. 16, a Web page printing apparatus of the present invention can be configured by selecting HTML format or a format equivalent thereto as an intermediate format to be temporality saved.

Other Embodiments

Aspects of the present invention can also be realized by a computer of a system or apparatus (or devices such as a CPU or MPU) that reads out and executes a program recorded on a memory apparatus to perform the functions of the above-described embodiments, and by a method, the steps of which are performed by a computer of a system or apparatus by, for example, reading out and executing a program recorded on a memory apparatus to perform the functions of the above-described embodiments. For this purpose, the program is provided to the computer for example via a network or from a recording medium of various types serving as the memory apparatus (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-022963, filed Feb. 3, 2009, which is hereby incorporated by reference herein in its entirety.

What is claimed is:

1. An information processing apparatus comprising:
a processor; and
a memory for storing a computer program,
wherein the processor executes the stored computer program to function as:
a providing unit configured to provide a window which includes a Web page area and a preview area, wherein an original of a Web page is displayed in the Web page area, and wherein the preview area displays a print preview image of the case where a part of the Web page is arranged;
a first selecting unit configured to select a part of the Web page displayed in the Web page area based on an area selection instructed on the Web page area by a user;
an arranging unit configured to arrange the selected part of the Web page on the print preview image displayed in the preview area when the user drags the selected part of the Web page from the Web page area and drops the dragged part of the Web page into the preview area;
an editing unit configured to edit the part of the Web page which has been arranged in the preview area by the arranging unit, wherein the editing unit changes a size of the part of the Web page arranged in the preview area if the user changes a size of a frame flame surrounding the part of the Web page arranged in the preview area; and
a control unit configured to control a printer to print the arranged and edited part of the Web page based on the print preview image in the preview area when accepting a print instruction from the user.

2. The information processing apparatus according to claim 1,
wherein the providing unit further provides a print button to accept the print instruction from the user; and
wherein the print instruction via the print button from the user is not accepted if the part of the Web page is not arranged in the preview area.

3. The information processing apparatus according to claim 1, further comprising:
a second selecting unit configured to display a plurality of candidates for parts of the Web page to automatically select a part of the Web page from the Web page area based on a user's choice out of the displayed candidates,
wherein the arranging unit arranges the automatically selected part of the Web page in the preview area if the second selecting unit automatically selects the part of the Web page from the Web page area based on the user's choice out of the displayed candidates.

4. The information processing apparatus according to claim 1, wherein the part of the Web page is an image.

5. A method executed by a processor of an information processing apparatus, said method comprising:
providing a window which includes a Web page area and a preview area, wherein an original of a Web page is displayed in the Web page area, and wherein the preview area displays a print preview image of the case where a part of the Web page is arranged;
selecting a part of the Web page displayed in the Web page area based on an area selection instructed on the Web page area by a user;
arranging the selected part of the Web page on the print preview image displayed in the preview area when the user drags the selected part of the Web page from the Web page area and drops the dragged part of the Web page into the preview area;

editing the part of the Web page which has been arranged in the preview area, wherein the editing changes a size of the part of the Web page arranged in the preview area if the user changes a size of a frame surrounding the part of the Web page arranged in the preview area; and controlling a printer to print the arranged and edited part of the Web page based on the print preview image in the preview area when accepting a print instruction from the user.

6. The method according to claim 5, wherein the providing further provides a print button to accept the print instruction from the user; and wherein the print instruction via the print button from the user is not accepted if the part of the Web page is not arranged in the preview area.

7. The method according to claim 5, further comprising:

displaying a plurality of candidates for parts of the Web page to automatically select a part of the Web page from the Web page area based on a user's choice out of the displayed candidates, wherein the automatically selected part of the Web page is arranged in the preview area based on the user's choice out of the displayed candidates.

8. The method according to claim 5, wherein the part of the Web page is an image.

9. A non-transitory computer readable storage medium storing a computer program for causing a computer to execute steps of:

providing a window which includes a Web page area and a preview area, wherein an original of a Web page is displayed in the Web page area, and wherein the preview area displays a print preview image of the case where a part of the Web page is arranged;

selecting a part of the Web page displayed in the Web page area based on an area selection instructed on the Web page area by a user;

arranging the selected part of the Web page on the print preview image displayed in the preview area when the user drags the selected part of the Web page from the Web page area and drops the dragged part of the Web page into the preview area;

editing the part of the Web page which has been arranged in the preview area, wherein the editing changes a size of the part of the Web page arranged in the preview area if the user changes a size of a frame surrounding the part of the Web page arranged in the preview area; and controlling a printer to print the arranged and edited part of the Web page based on the print preview image in the preview area when accepting a print instruction from the user.

10. The non-transitory computer readable medium according to claim 9, wherein the providing further provides a print button to accept the print instruction from the user; and wherein the print instruction via the print button from the user is not accepted if the part of the Web page is not arranged in the preview area.

11. The non-transitory computer readable medium according to claim 9, wherein the computer program further causes the computer to execute step of:

displaying a plurality of candidates for parts of the Web page to automatically select a part of the Web page from the Web page area based on a user's choice out of the displayed candidates, wherein the automatically selected part of the Web page is arranged in the preview area based on the user's choice out of the displayed candidates.

12. The non-transitory computer readable medium according to claim 9, wherein the part of the Web page is an image.

* * * * *